United States Patent
Hoevel et al.

(10) Patent No.: US 10,563,098 B2
(45) Date of Patent: Feb. 18, 2020

(54) STABILIZATION OF HOT MELT ADHESIVES

(71) Applicant: BASF SE, Ludwigshafen (DE)

(72) Inventors: Bernd Hoevel, Sinzheim (DE);
Angelika Roser, Mannheim (DE);
Claudia Fischer, Waldsee (DE);
Heinrich Martin, Patteln (CH)

(73) Assignee: BASF SE, Ludwigshafen (DE)

( * ) Notice: Subject to any disclaimer, the term of this patent is extended or adjusted under 35 U.S.C. 154(b) by 190 days.

(21) Appl. No.: 15/575,395

(22) PCT Filed: May 19, 2016

(86) PCT No.: PCT/EP2016/061181
§ 371 (c)(1),
(2) Date: Nov. 20, 2017

(87) PCT Pub. No.: WO2016/184932
PCT Pub. Date: Nov. 24, 2016

(65) Prior Publication Data
US 2018/0148612 A1    May 31, 2018

(30) Foreign Application Priority Data

May 21, 2015  (EP) .................................... 15168680

(51) Int. Cl.
| C09J 11/06 | (2006.01) |
| C09J 153/02 | (2006.01) |
| C09J 5/06 | (2006.01) |
| C09J 123/02 | (2006.01) |
| C09J 165/00 | (2006.01) |
| C09J 191/00 | (2006.01) |
| C09J 191/08 | (2006.01) |
| C09J 193/04 | (2006.01) |

(52) U.S. Cl.
CPC .................. *C09J 11/06* (2013.01); *C09J 5/06* (2013.01); *C09J 123/02* (2013.01); *C09J 153/02* (2013.01); *C09J 165/00* (2013.01); *C09J 191/00* (2013.01); *C09J 191/08* (2013.01); *C09J 193/04* (2013.01); *C09J 2423/00* (2013.01); *C09J 2453/00* (2013.01); *C09J 2491/00* (2013.01); *C09J 2493/00* (2013.01)

(58) Field of Classification Search
CPC . C08J 11/06; C08K 5/005; C08K 5/34; C08K 5/00
See application file for complete search history.

(56) References Cited

U.S. PATENT DOCUMENTS

| 5,204,390 A | 4/1993 | Szymanski et al. |
| 5,750,622 A | 5/1998 | Himes |
| 6,485,825 B1 | 11/2002 | Heguri et al. |
| 2004/0014863 A1 | 1/2004 | Lorenz et al. |

FOREIGN PATENT DOCUMENTS

| CN | 1105037 A | 7/1995 |
| CN | 102911633 A | 2/2013 |
| EP | 0 238 135 A2 | 9/1987 |
| EP | 0367 165 A1 | 5/1990 |
| EP | 2 835 406 A1 | 2/2015 |

OTHER PUBLICATIONS

International Search Report dated Jul. 5, 2016 in PCT/EP2016/061181 filed May 19, 2016.
Office Action and Search Report dated Apr. 3, 2019 in the corresponding Chinese Patent Application No. 201680028377.5 (with English Translation of Category of cited documents) citing documents AA-AC and AO-AQ therein 8 pages.

*Primary Examiner* — Peter D. Mulcahy
(74) *Attorney, Agent, or Firm* — Oblon, McClelland, Maier & Neustadt, L.L.P.

(57) ABSTRACT

The present invention pertains to a stabilized hot melt adhesive containing a) one or more hot melt adhesive materials and b) a stabilizer composition. The one or more hot melt adhesive materials a) include a polyolefin, a styrene-isoprene-styrene block co-polymer, a styrene-butadiene-styrene block co-polymer, a polyacrylate, an acryl-copolymer, an ethylene vinyl acetate, a polyamide, a polyester, a polyurethane, a polyimide, a silane terminated polyolefin, a silane terminated poly-ether, and a silane terminated polyurethane. The stabilizer composition includes two or three of a component (A) which is a specific sterically hindered amine, a component (B) which is a polymeric sterically hindered amine, and a component (C) which is a specific sterically hindered phenol.

11 Claims, No Drawings

STABILIZATION OF HOT MELT ADHESIVES

The present invention pertains to a stabilized hot melt adhesive comprising a) one or more hot melt adhesive materials selected from the group consisting of polyolefins such as amorphous poly-alpha-olefins, metallocene based polyolefins, styrene-isoprene-styrene (SIS) block copolymer, styrene-butadiene-styrene (SBS) block co-polymer, styrene-ethylene-butadiene-styrene (SEBS), polyacrylate, acryl-copolymer, ethylene vinyl acetate, polyamide, polyester, polyurethane, polyimide, silane terminated polyolefin, silane terminated polyether and silane terminated polyurethane; and b) a stabilizer composition comprising or consisting of two or three of components (A), (B) and (C), wherein (A) is a specific sterically hindered amine (HALS), (B) is a polymeric sterically hindered amine (HALS), and (C) is a specific sterically hindered phenol.

The present invention also pertains to a method of stabilizing a hot melt adhesive against degradation by one or more of light, oxygen and heat, comprising the following steps: providing one or more hot melt adhesive materials selected from the group consisting of polyolefins such as amorphous poly-alpha-olefins, metallocene based polyolefins, styrene-isoprene-styrene (SIS) block co-polymer, styrene-butadiene-styrene (SBS) block co-polymer, styrene-ethylene-butadiene-styrene (SEBS), polyacrylate, acryl-copolymer, ethylene vinyl acetate, polyamide, polyester, polyurethane, polyimide, silane terminated polyolefin, silane terminated polyether and silane terminated polyurethane, silane terminated polyacrylate and adding a stabilizer composition as defined herein.

The present invention further pertains to the use of a stabilizer composition as defined herein for stabilizing a hot melt adhesive against degradation by one or more of light, oxygen and heat, wherein the hot melt adhesive material is selected from polyolefins such as amorphous poly-alpha-olefins, metallocene based polyolefins, styrene-isoprene-styrene (SIS) block co-polymer, styrene-butadiene-styrene (SBS) block co-polymer, styrene-ethylene-butadiene-styrene (SEBS), polyacrylate, acryl-copolymer, ethylene vinyl acetate, polyamide, polyester, polyurethane, polyimide, silane terminated polyolefin, silane terminated polyether, silane terminated polyacrylate and silane terminated polyurethane.

Hot melt adhesive (HMA), also known as hot glue, is a form of thermoplastic adhesive that is supplied in different forms ranging from solid cylindrical sticks of various diameters up to pillows or blocks in siliconized paper, designed to be melted in an electric hot glue machine (i.e. melting pots, heated ring mains, guns etc). The application device uses a continuous-duty heating element to melt the plastic glue, which may be pushed through a gun by a mechanical trigger mechanism, or directly by the user. The glue squeezed out of the heated nozzle is initially hot enough to achieve low enough viscosity to wet the surface appropriately. The glue is tacky when hot, and solidifies in a few seconds to one minute. Hot melt adhesives can also be applied by slot dies, curtain coating or spraying. There are also hot melt adhesives that maintain their tackiness after dispensing even at room temperature. Those hot melts are commonly referred to as hot melt pressure sensitive adhesives (HM-PSA)

Hot melt adhesives have long shelf life and usually can be used after prolonged period of storage. Some of the disadvantages involve thermal load of the substrate, limiting use to substrates not sensitive to higher temperatures, and loss of bond strength at higher temperatures, up to complete melting of the adhesive. This can be reduced by using a reactive adhesive that after solidifying undergoes further curing e.g., by moisture (e.g., reactive urethanes and silanes), or is cured by ultraviolet radiation.

Hot melt glues usually comprise a composition with various additives. The composition is usually formulated to have a glass transition temperature (differentiating the glassy from the rubbery state) below the lowest service temperature and a suitably high melt temperature as well. The degree of crystallization determines the open time of the adhesive. The melt viscosity and the crystallization rate (and corresponding open time) can be tailored for the application. Higher crystallization rate usually implies higher bond strength. Some polymers can form hydrogen bonds between the chains, forming pseudo-cross-links strengthening the polymer. Other polymers form pseudo cross links between blocks of similar nature such as SBS or SIS.

The nature of the polymer, tackifier, resin and additive influences the nature of mutual molecular interaction and interaction with the substrate. Polar groups, hydroxyls and amine groups can form hydrogen bonds with polar groups on substrates like paper or wood or natural fibers.

Nonpolar polyolefin chains interact well with nonpolar substrates. Good wetting of the substrate is essential for forming a satisfying bond between the adhesive and the substrate. More polar compositions tend to have better adhesion due to their higher surface energy. The distribution of molecular weights and degree of crystallinity influences the width of melting temperature range. Polymers with crystalline nature tend to be more rigid and have higher cohesive strength than the corresponding amorphous ones, but also transfer more strain to the adhesive-substrate interface. Higher molecular weight of the polymer chains provides higher tensile strength and heat resistance. Presence of unsaturated bonds makes the adhesive more susceptible to autoxidation and UV degradation and necessitates use of antioxidants and stabilizers.

Increase of bond strength and service temperature can be achieved by formation of cross-links in the polymer after solidification. This can be achieved by using polymers undergoing curing with residual moisture (e.g., reactive polyurethanes, silicones), exposition to ultraviolet radiation, electron irradiation, or by other methods.

Some of the possible base materials of hot-melt adhesives include the following:

Polyolefins (PO) (polyethylene (usually LDPE but also HDPE; HDPE has higher melting point and better temperature resistance), atactic polypropylene (PP or APP), polybutene-1, oxidized polyethylene, etc.) provide very good adhesion to polypropylene, good moisture barrier, chemical resistance against polar solvents and solutions of acids, bases, and alcohols. Polyolefins have low surface energy and provide good wetting of most metals and polymers. Polyolefins made by metallocene catalyzed synthesis have narrow distribution of molecular weight and correspondingly narrow melting temperature range. PE and APP are usually used on their own or with just a small amount of tackifiers (usually hydrocarbons) and waxes (usually paraffins or microcrystalline waxes. Polybutene-1 and its copolymers are soft and flexible, tough, partially crystalline, and slowly crystallizing with long open times. The low temperature of recrystallization allows for stress release during formation of the bond.

Amorphous polyolefin (APO/APAO) polymers are compatible with many solvents, tackifiers, waxes, and polymers; they find wide use in many adhesive applications. APO hot melts have good fuel and acid resistance, moderate heat resistance, are tacky, soft and flexible, have good adhesion and longer open times than crystalline polyolefins. APOs tend to have lower melt viscosity, better adhesion, longer open times and slow set times than comparable EVAs. Some APOs can be used alone, but often they are compounded with tackifiers, waxes, and plasticizers (e.g., mineral oil, poly-butene oil). Examples of APOs include amorphous (atactic) propylene (APP), amorphous propylene/ethylene (APE), amorphous propylene/butene (APB), amorphous propylene/hexene (APH), amorphous propylene/ethylene/butene.

Styrene block copolymers (SBC), also called styrene copolymer adhesives and rubber-based adhesives, have good low-temperature flexibility, high elongation, and high heat resistance. They are frequently used in pressure-sensitive adhesive applications, where the composition retains tack even when solidified; however non-pressure-sensitive formulations are also used. They usually have A-B-A structure, with an elastic rubber segment between two rigid plastic endblocks. The A-B-A structure promotes a phase separation of the polymer, binding together the endblocks, with the central elastic parts acting as cross-links; thus SBCs do not require additional cross-linking. Styrene-butadiene-styrene (SBS) polymers are used in high-strength PSA applications. Styrene-isoprene-styrene (SIS) polymers are used in low-viscosity high-tack PSA applications. Styrene-ethylene/butylene-styrene (SEBS) are used in low self-adhering nonwoven applications.

The usual other ingredients of hot melt adhesive include the following:

tackifying resins (e.g., rosins and their derivates, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and their mixtures, terpene-phenol resins (TPR, used often with EVAs). Tackifiers tend to have low molecular weight, and glass transition and softening temperature above room temperature, providing them with suitable viscoelastic properties;

waxes, e.g. microcrystalline waxes, fatty amide waxes or oxidized Fischer-Tropsch waxes, increase the setting rate. One of the key components of formulations, waxes lower the melt viscosity and can improve bond strength and temperature resistance;

plasticizers (e.g., benzoates such as 1,4-cyclohexane dimethanol dibenzoate, glyceryl tribenzoate, or pentaerythritol tetrabenzoate, phthalates, paraffin oils, polyisobutylene, chlorinated paraffins, etc.);

antioxidants and stabilizers (e.g. hindered phenols, phosphites, phosphates, hindered aromatic amines). These compounds protect the material from thermal degradation and degradation by ultraviolet radiation both during service life, compounding and in molten state during application.

Current selection of antioxidants for hot melt adhesives is largely leveraged from plastics application as can be seen when technical data sheets of well-known Irganox® blends are listed, which are applicable for adhesive application. However, for hot melt adhesives (HMA) application the base polymers are combined with tackifiers and oil for pressure sensitive adhesives (PSA) or wax for non-PSA application.

The stabilization chosen only by the base polymer is not giving optimal results for hot melt adhesives. Typically the selection of stabilizers is driven by the base polymer which is giving to little attention to tackifier and waxes which are important for the adhesion and application window. Especially for those hot melt adhesives where there is a trend to lower application temperatures like metallocene based polyolefin (mPO) HMA the selection of plastic stabilizers is not appropriate. With application temperatures going down from 170° C. to 150° C. or less the classical secondary stabilization with phosphites are no longer acting synergistically. The same trend is also observable for acrylic hot melt pressure sensitive adhesives (HM-PSA) where application temperatures can be as low as 120° C.

Therefore, it is an object of the present invention to identify radical-scavenger combinations that are working synergistically already at lower temperatures and take account of the stabilization of the tackifier and the extenders like oil or wax at the same time.

It has been found that the combination of hindered amine light stabilizers (HALS) with hindered phenols is working particularly well for the stabilization of HMAs.

Accordingly, in a first aspect the present invention relates to a hot melt adhesive comprising a) one or more hot melt adhesive materials selected from the group consisting of polyolefins such as amorphous poly-alpha-olefins, metallocene based polyolefins, styrene-isoprene-styrene (SIS) block co-polymer, styrene-butadiene-styrene (SBS), styrene-ethylene-butadiene-styrene (SEBS) block co-polymer, polyacrylate, acrylcopolymer, ethylene vinyl acetate, polyamide, polyester, polyurethane, polyimide, silane terminated polyolefin, silane terminated polyether and silane terminated polyurethane; and b) a stabilizer composition comprising or consisting of two or three of components (A), (B) and (C), wherein (A) is a sterically hindered amine (HALS) selected from the group consisting of:

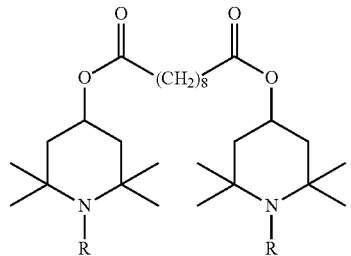

A-(I)

wherein R = H, CH$_3$ or OC$_8$H$_{17}$

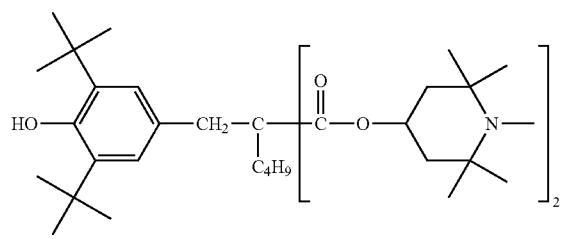

A-(II)

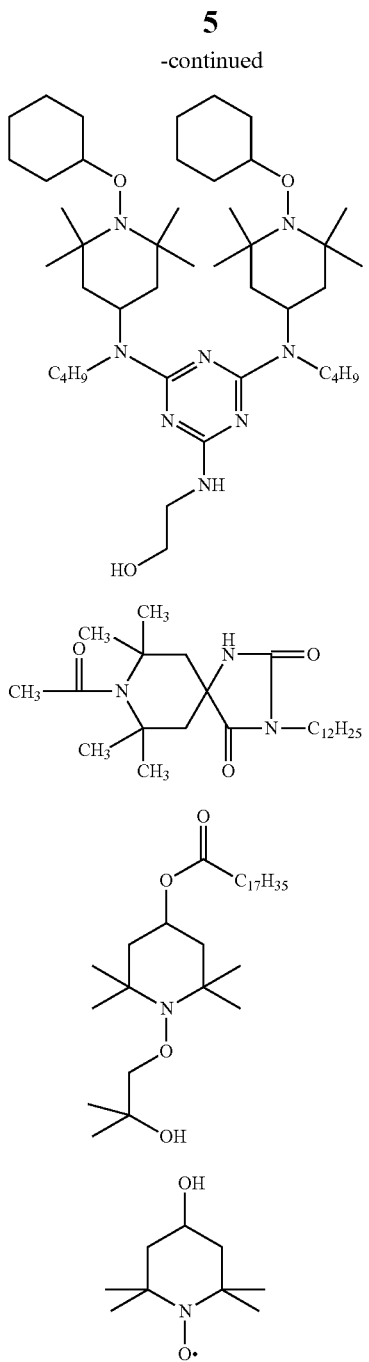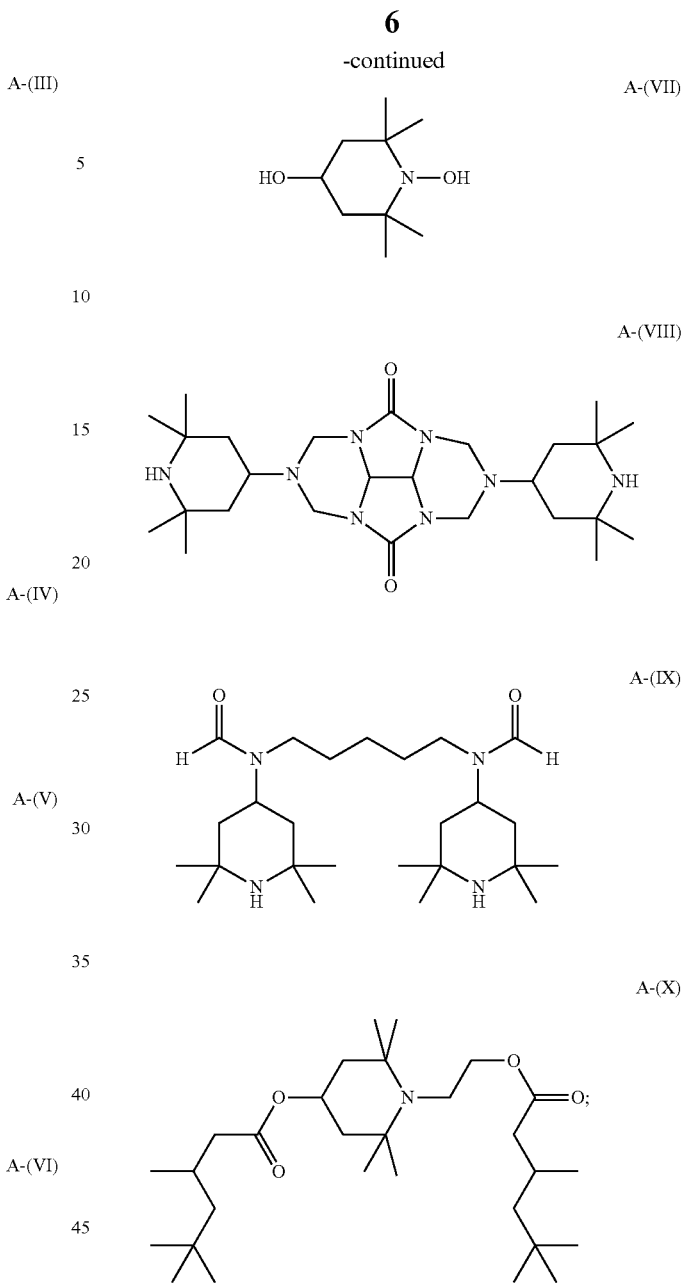
(B) is a polymeric sterically hindered amine (HALS) selected from the group consisting of:
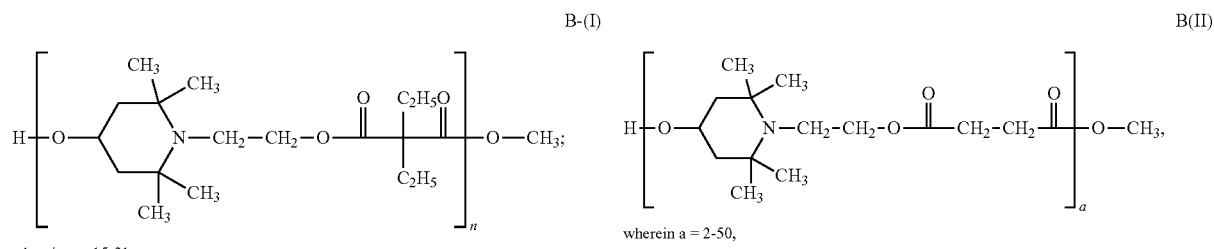

B-(III)
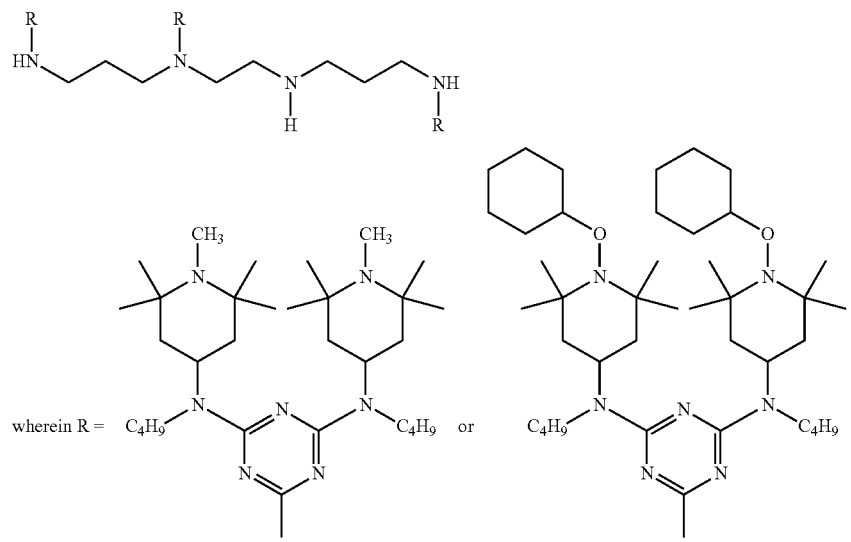
B-(IV)
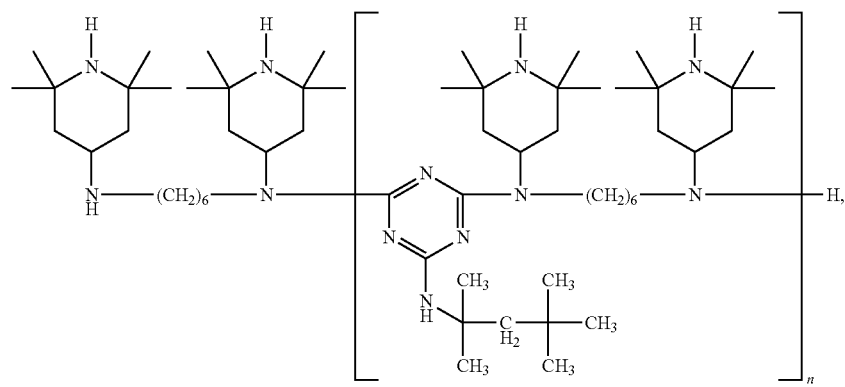
wherein n = 3-5,
B-(V)
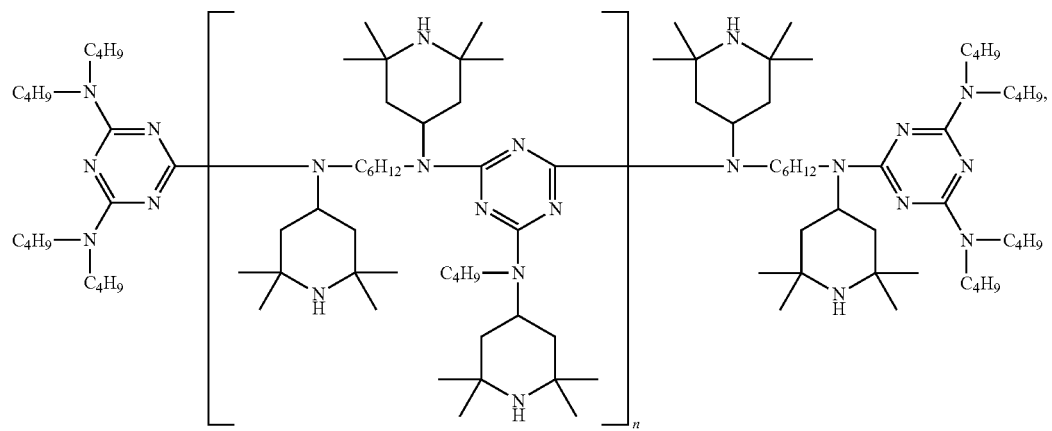
wherein n = is 3-5, -continued
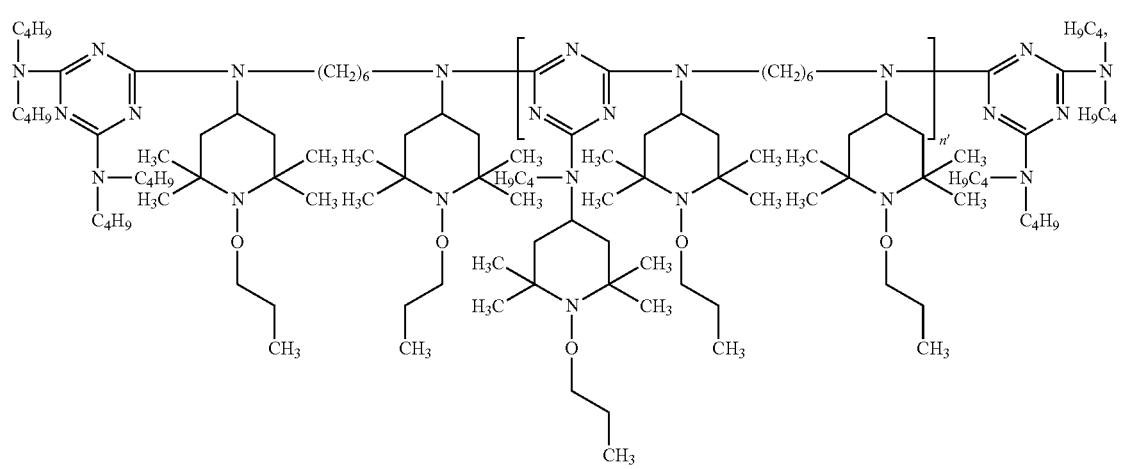
B-(VI)
wherein n = 3-5,
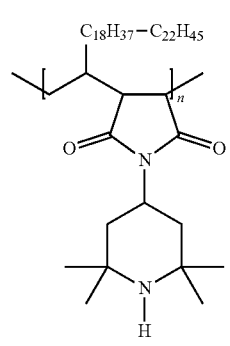
B-(VII)
wherein n = 5-8;
(C) is a sterically hindered phenol selected from the group consisting of:
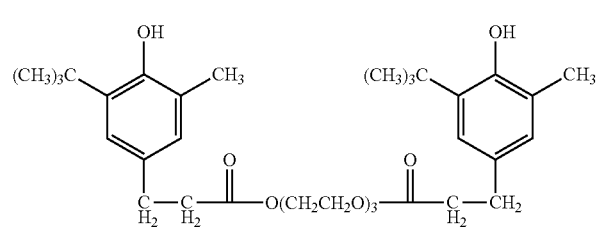
C-(I)
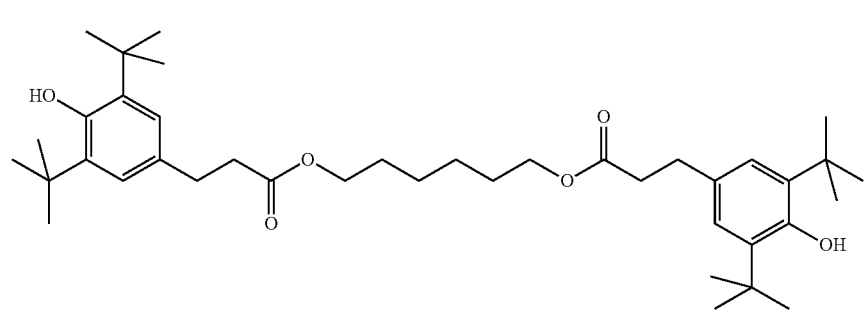
C-(II)

-continued
C-(III)
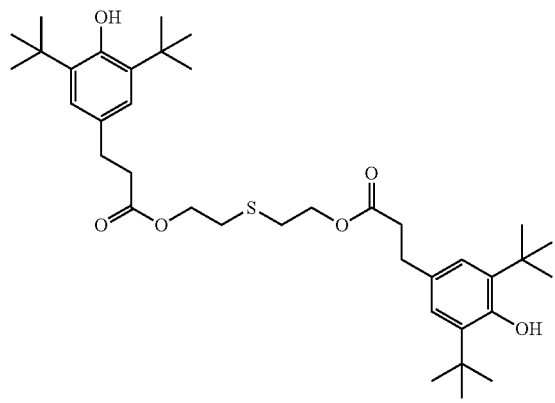
C-(IV)
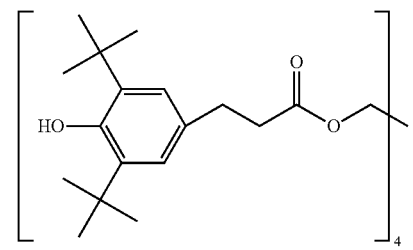
C-(V)
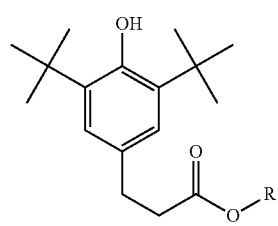
wherein R = C₈H₁₇ or C₁₈H₃₇
C-(VI)
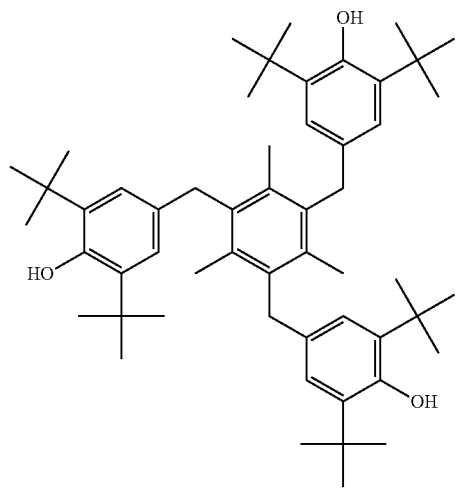
C-(VII)
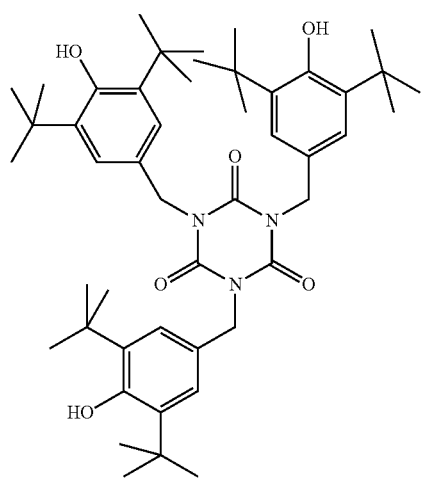
C-(VIII)
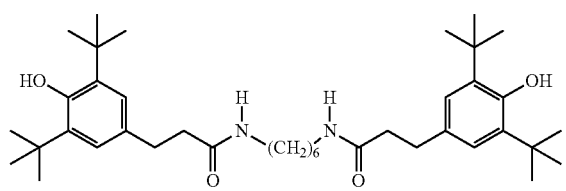
C-(IX)
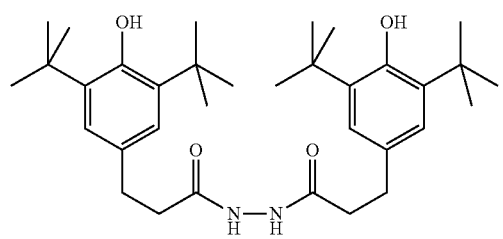

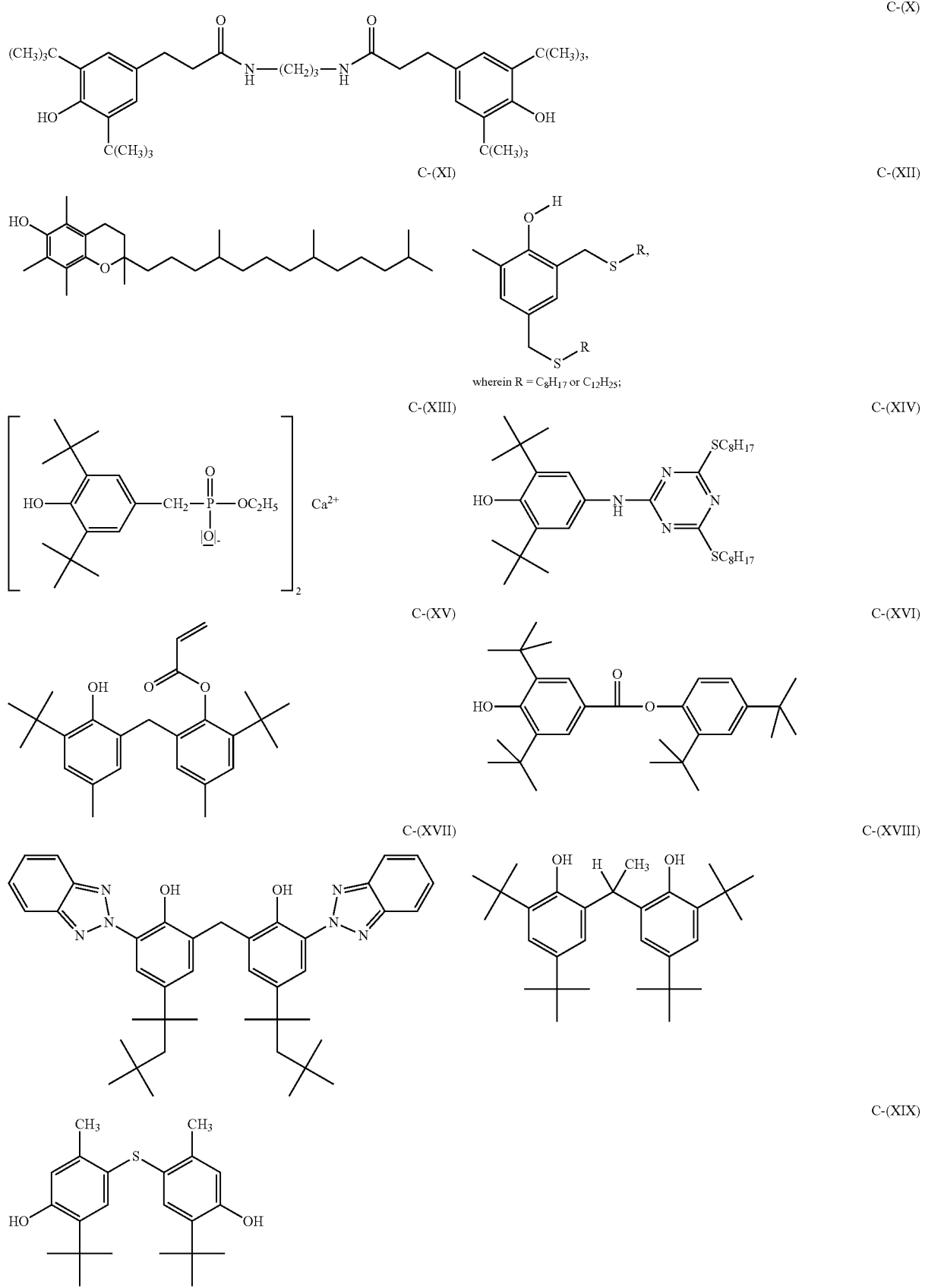

In a preferred embodiment, the stabilizer composition as described herein comprises or consists of components (A) and (C). In this embodiment, the weight ratio between components (A) and (C) preferably is between 1:5 and 5:1.

In another preferred embodiment, the stabilizer composition as described herein comprises or consists of components (B) and (C). In this embodiment, the weight ratio between components (B) and (C) preferably is between 1:5 and 5:1.

In a further preferred embodiment, the stabilizer composition as described herein comprises or consists of components (A), (B) and (C). In this embodiment, the weight ratio between components (A), (B) and (C) preferably is between 8:1:1 and 1:8:1 and 1:1:8.

Preferably, component (A) is selected from the group consisting of: A-(I), A-(II), A-(III), A-(V), A-(VII), A-(IX), A-(X).

Even more preferably, component (A) is selected from the group consisting of: A-(I), A-(III).

Preferably, component (B) is selected from the group consisting of: B-(II), B-(III), B-(IV), B-(V), B-(VI).

Even more preferably, component (B) is selected from the group consisting of: B-(II), B-(IV).

Preferably, component (C) is selected from the group consisting of: C-(I), C-(II), C-(III), C-(IV), C-(V), C-(VI), C-(VII), C-(VIII), C-(IX), C-(X), C-(XI), C-(XII), C-(XIII), C-(XIV).

Even more preferably, component (C) is selected from the group consisting of: C-(III), C-(IV), C-(V), C-(XII), C-(XIV).

In a preferred embodiment the hot melt adhesive according to the present invention comprises metallocene based polyolefins as one or more hot melt adhesive materials.

In an embodiment the hot melt adhesive according to the present invention does not comprise a branched polyurethane-polyacrylate resin containing silicon resin, a branched polyurethane-silicon containing polyacrylate resin or a branched polyurethane-polyacrylate resin.

Preferably, the stabilizer composition further comprises one or more additives selected from the group consisting of: phosphite such as Irgafos 12 CAS 80410-33-9, 2, 2',2"-Nitrilo[triethyltris[3,3,5,5-tetra-tert.-butyl-1,1-biphenyl-2,2diyl]] phosphite, Irgafos 38 CAS 145650-60-8 Bis(2,4-di-tert.-butyl-6-methylphenyl)-ethyl-phosphite, Irgafos 126 CAS 26741-53-7 Bis-(2,4-ditert.-butylphenol)pentaerythritol diphosphite, Irgafos 168 CAS 31570-04-4 Tris(2,4-di-tert.butylphenyl)phosphite, Irgafos P-EPQ CAS 119345-01-6 Tetrakis(2,4-di-tert-butylphenyl)[1,1-biphenyl]-4,4'-diylbisphosphonite, Irgafos TNPP CAS 26523-78-4 Tri-(nonylphenol)-phosphite thioether such as Irganox PS 800 CAS 123-28-4 Didodecyl-3,3'-thiodipropionate, Irgafos 802 CAS 693-36-7 3,3'-Thiodipropionic acid dioctadecylester, secondary arylamine such as Irganox 5057 CAS 68411-46-1 Benzenamine, N-phenyl-, reaction products with 2,4,4-trimethylpentene, hydroxyl-amine based stabilizers such as Irgastab FS 042 Oxidized bis(hydrogenated tallow alkyl) amines, optical brighteners such as Tinopal OB CO CAS 7128-64-5,5-thiophenediylbis(5-tert-butyl-1,3-benzoxazole), UV-absorber such as from the class of benzophenones, cyanoacrylate, formamidine, oxanilide, benzotriazols, hydroxphenyltriazines and inorganic stabilizer.

In a further aspect, the present invention relates to a method of stabilizing a hot melt adhesive against degradation by one or more of light, oxygen and heat, comprising the following steps:

providing one or more hot melt adhesive materials selected from the group consisting of polyolefins such as amorphous poly-alpha-olefins, metallocene based polyolefins, styrene-isoprene-styrene (SIS) block co-polymer, styrene-butadiene-styrene (SBS), styrene-ethylene-butadiene-styrene (SEBS) block co-polymer, polyacrylate, acryl-copolymer, ethylene vinyl acetate, polyamide, polyester, polyurethane, polyimide, silane terminated polyolefin, silane terminated polyether and silane terminated polyurethane, silane terminated polyacrylate and adding a stabilizer composition as defined herein.

In an even further aspect, the present invention relates to the use of a stabilizer composition as defined herein for stabilizing a hot melt adhesive against degradation by one or more of light, oxygen and heat, wherein the hot melt adhesive material is selected from polyolefins such as amorphous poly-alpha-olefins, metallocene based polyolefins, styrene-isoprene-styrene (SIS) block co-polymer, styrene-butadiene-styrene (SBS), styrene-ethylene-butadiene-styrene (SEBS) block co-polymer, polyacrylate, acryl-copolymer, ethylene vinyl acetate, polyamide, polyester, polyurethane, polyimide, silane terminated polyolefin, silane terminated polyether, silane terminated polyacrylate and silane terminated polyurethane.

The present invention is further described by the following non-limiting examples.

Hot Melt Formulations

All materials in the following sections are added to a kneader at room temperature (RT, 25° C.). The kneader is closed and evacuated to 0.1 mbar. After that the temperature of the kneader is raised from room temperature to 155° C. At a temperature of 120° C. the kneading is started and continued for 0.5 Hrs.

TABLE 1

| Metallocene based Polyolefin HMA | | | | | |
|---|---|---|---|---|---|
| Raw Material | Type of Material | Supplier | 138281 Wt % | 140581.1 Wt % | 140581.2 Wt % |
| Affinity GA 1950 | Metallocene Polyolefin Plastomer | Dow | 33.3 | 33.3 | 33.3 |
| Eastotac 130 R | Hydrogenated Hydrocarbon Resin | Exxon | 33.3 | 33.3 | 33.3 |
| Catenex S 523 | Paraffin Oil | Shell | 33.3 | | |
| Paraflint H1 | Paraffin Wax | Sasol | | 33.3 | |
| Luwax PE 10 M | Paraffin Wax | BASF | | | 33.3 |
| Total | | | 100 | 100 | 100 |

Wt % = Weight percent

TABLE 2

| SIS based HM-PSA | | | | | |
|---|---|---|---|---|---|
| Raw Material | Type of Material | Supplier | 140525 Wt % | 141150 Wt % | 142492 Wt % |
| Kraton D-1102 | Linear SBS/SB Polymer | Kraton | 25 | | |
| Kraton D 1161 PT | SIS, linear triblock | Kraton | | 40 | 44 |
| Sylvalite RE 85 L | Rosin Ester | Arizona | | | 44 |
| Foral 85 E | Hydrogenated Rosin Ester | Eastman | 25 | | |

TABLE 2-continued

SIS based HM-PSA

| Raw Material | Type of Material | Supplier | 140525 Wt % | 141150 Wt % | 142492 Wt % |
|---|---|---|---|---|---|
| Escorez 5300 | Cycloaliphatic hydrocarbon resin | Exxon | | 50 | |
| Eastotac H 130 R | Hydrogenated Hydrocarbon Resin | Eastman | 25 | | |
| Catenex Oil S 523 | paraffin oil | Shell | | 10 | 12 |
| Luwax PE 10 M | Paraffin wax | BASF | 25 | | |
| Total | | | 100 | 100 | 100 |

Materials Used:

| Raw Material | Supplier | Description |
|---|---|---|
| Affinity GA 1950 | Dow | Polyolefin Plastomer (PO) produced via INSITE™ technology from Dow Plastics. Density = 0.855 g/cc, MFi = 500 |
| Eastotac 130 R | Eastman | Eastotac™ H-130R is a hydrogenated hydrocarbon resin, having a ring and ball softening point of 130° C. and a molten Gardner color of 4. |
| Catenex S 523 | Shell | Shell Catenex oil is a paraffinic process oil manufactured via solvent extraction process with a refractive index of (ASTM D 1218) of 1,478 |
| Paraflint H1 | Sasol | Synthetic wax made by the Fischer-Tropsch process with a congealing point 208° F. Possesses similar structure to paraffin wax, higher melting point, hardness and molecular weight. Used in hot melt adhesives |
| LuwaxPE 10 M | BASF | Polyethylene wax based on ethylene copolymer that contains acidic groups, melting point (DSC) 110-118° C. |
| Kraton D-1102 | Kraton | Kraton D1102 K is a clear, linear triblock copolymer based on styrene and butadiene, with a polystyrene content of 28% and a Solution Viscosity (BAM 922) of cps 1100 |
| Kraton D 1161 PT | Kraton | Kraton ® D-1161 polymer is a clear linear triblock copolymer based on styrene and isoprene, with bound styrene of 15% mass. Melt flow rate 200° C./5 kg (ISO 1133) 9 g/10 min |
| Foral 85-E | Eastman | Hydrogenated Rosin Ester with a softening point of 80-88° C. (Hercules Drop method) and a melt viscosity of 340 mPas at 140° C. |
| Eastotec H-130R | Eastman | Eastotac™ H-130R is a hydrogenated hydrocarbon resin, having a ring and ball softening point of 130° C. and a molten Gardner color of 4. |
| Escorez 5300 | Exxon Mobile | Escorez 5300 is a water white cycloaliphatic hydrocarbon resin with a glass transition temp, of 55° C. |
| Sylvalite RE 85 L | Arizona | SYLVALITE ® RE 85L RESIN is a polyol ester of rosin with a softening point, Ring & Ball, ° C. 83-87° C. |
| EVA 2075.1 | Buehnen | Commercially available Ethyl-Vinyl-Acetat Hot Melt; water clear. |

Stabilizer Compositions

TABLE 3

Stabilizer compositions 139485

| Compound of formula | Material | Std. 0 phr | Cmp. 1 phr | Cmp. 2 phr | Cmp. 3 phr | Cmp 4 phr | Cmp. Exp. 5 phr | Inv. 6 phr | Inv. 7 phr | Inv. 8 phr | Inv. 9 phr |
|---|---|---|---|---|---|---|---|---|---|---|---|
| C-(IV) | Irganox 1010 | 0 | 0.5 | 0.25 | | | | | | | |
| C-(V) | Irganox 1076 | 0 | | | | | 0.5 | 0.1 | 0.2 | 0.3 | 0.4 |
| A-(I) | Tinuvin 770 | 0 | | | | 0.4 | | 0.3 | 0.2 | 0.1 | |
| 2:1 Mix C-(IV)/ Irgafos 168 | Irganox B 215 | 0 | | | 0.5 | | | | | | |

TABLE 3-continued

Stabilizer compositions 139485

| Compound of formula | Material | Std. 0 phr | Cmp. 1 phr | Cmp. 2 phr | Cmp. 3 phr | Cmp Exp. 4 phr | Cmp. 5 phr | Inv. 6 phr | Inv. 7 phr | Inv. 8 phr | Inv. 9 phr |
|---|---|---|---|---|---|---|---|---|---|---|---|
| 1:1 Mix C-(IV)/ Irgafos 168 | Irganox B 225 | 0 | | | | | 0.5 | | | | |

Std. = Standard for this experiment pool, i.e. without stabilization
Cmp. = Comparative Example
Inv. = Innovative Example
Exp. = Experiment Number
Phr = parts per hundred resin

TABLE 4

Stabilizer compositions 140622

| Compound of formula | Material | Std. 0 phr | Cmp. 1 phr | Cmp. Exp. 2 phr | Inv. 3 phr | Inv. 4 phr | Inv. 5 phr |
|---|---|---|---|---|---|---|---|
| B-(II) | Tinuvin 622 SF | 0 | 0.3 | | | | |
| A-(I) | Tinuvin 770 | 0 | | | 0.15 | 0.15 | 0.1 |
| C-(III) | Irganox 1035 | 0 | | 0.3 | 0.15 | | 0.1 |
| C-(XII) | Irganox 1726 | 0 | | | | 0.15 | 0.1 |

TABLE 5

Stabilizer composition 141305

| Compound of formula | Material | Std. 0 phr | Cmp. 1 Phr | Cmp. 2 phr | Cmp. 3 phr | Cmp Exp. 4 phr | Inv. 5 phr | Inv. 6 phr | Inv. 7 phr |
|---|---|---|---|---|---|---|---|---|---|
| C-(V) | Irganox 1076 | | | | | | | | 0.3 |
| C-(III) | Irganox1035 | | 1 | | | | 0.3 | 0.3 | |
| C-(XIV) | Irganox 565 | | | 1 | | | | | |
| B-(II) | Tinuvin 622 SF | | | | | 1 | 0.3 | | |
| B-(IV) | Chimasorb 944 | | | | | | | 0.3 | 0.3 |
| | Irgafos 168 | | | | | | 0.3 | 0.3 | 0.3 |
| | Irganox PS 800 | | | | 1 | | | | |

TABLE 6

Stabilizer composition 142823

| Compound of formula | Material | Std. 0 | Cmp 1 phr | Cmp 2 phr | Cmp 3 phr | Cmp Exp. 4 phr | Inv. 5 phr | Inv. 6 phr | Inv. 7 phr | Inv. 8 phr | Inv. 9 phr |
|---|---|---|---|---|---|---|---|---|---|---|---|
| A-(I) | Tinuvin 770 | | 0.6 | | | | 0.2 | 0.2 | 0.2 | 0.2 | 0.3 |
| B-(II) | Tinuvin 622 | | | 0.6 | | | 0.2 | 0.2 | 0.2 | | |
| B-(IV) | Chimasorb 944 | | | | 0.6 | | | | | | |
| C-(iv) | Irganox 1010 | | | | | 0.6 | 0.2 | | | | 0.3 |
| C-(V) | Irganox 1076 | | | | | | 0.4 | | 0.2 | | |
| C-(III) | Irganox 1035 | | | | | | | | | 0.2 | |

TABLE 7

Stabilizer Composition 142523

| Compound of formula | Material | Std. 0 phr | Cmp. 1 phr | Cmp. 2 phr | Cmp. Exp. 3 phr | Inv. 4 phr | Inv. 5 phr | Inv. 6 phr |
|---|---|---|---|---|---|---|---|---|
| A-(I) | Tinuvin 770 | | 0.5 | | | 0.5 | 0.33 | 0.33 |
| B-(II) | Tinuvin 622 | | 0.5 | | | | 0.33 | 0.33 |
| C-(III) | Irganox 1035 | | | | | | | 0.33 |
| C-(IV) | Irganox 1010 | | | | 0.5 | | | |
| C-(V) | Irganox 1076 | | | 0.5 | | 0.5 | 0.33 | |
| | Irgafos 168 | | | 0.5 | | | | |
| | Irganox PS 800 | | | | 0.5 | | | |

TABLE 8

Stabilizer Composition 140747

| Compound of formula | Add | Std. 0 phr | Cmp. 1 phr | Cmp. 2 phr | Cmp. Exp. 3 phr | Cmp. 4 phr | Cmp. 5 phr | Inv. 6 phr | Inv. 7 phr |
|---|---|---|---|---|---|---|---|---|---|
| B-(II) | Tinuvin 622 | | | | | | | 33.3 | 33.3 |
| C-(XII) | Irganox 1726 | | 1 | 66.6 | 33.3 | | | 66.6 | |
| C-(V) | Irganox 1076 | | | | | 1 | 0.5 | | |
| C-(III) | Irganox 1035 | | | | | | | | 33.3 |
| | Irgafos 168 | | | 33.3 | 66.6 | | 0.5 | | 33.3 |

TABLE 9

Stabilizer Composition 147802

| | Null | B 900 | Inv. |
|---|---|---|---|
| Nr. | 0 | 5 | 6 |
| Irganox 1076 | 0 | 20% | 60% |
| Irgafos 168 | 0 | 80% | |
| Tinuvin 770 | | | 40 |

Test Results

The hot melt formulation is prepared using a sigma-blade kneader. Tackifier, resins and oil or wax are placed in the 150 ml chamber of a "Werner & Pfleiderer" kneader (Type LUK 025). The kneader is evacuated and heated up. The kneader is started at a temperature of 100° C. with 100 rpm. When a temperature of 165° C. is reached kneading is continued for further 30 min.

Tests are performed according to ASTM D 4499 (DIN EN ISO 10363). Results are given in Gardner color number index acc. ASTM D-6166. Higher numbers mean higher color, i.e. higher oxidation. The effectiveness of a stabilizer package can be ranked by the color number. Keeping lower numbers for a longer time mean better effectiveness of the radical scavenger package.

The adhesion is tested using a probe tack tester (Testing Machines Inc., machine 80-02-01) according to ASTM D2979-95 (DIN 55405). Higher gram value means higher tack and is preferred.

The viscosities are measured using a CAP 2000+ Viscometer (Brookfield) according to ASTM D 3236. Higher remaining values after the temperature aging means lesser damage to the polymer and is preferred.

Results of Stabilizations

TABLE 10

Results of stabilizing formulation 138281 with stabilizer compositions 139485

| Hrs. | Exp. 0 | 1 | 2 | 3 | 4 | 5 | 6 | 7 | 8 | 9 |
|---|---|---|---|---|---|---|---|---|---|---|
| 0 | 5 | 5 | 5 | 5 | 5 | 5 | 5 | 5 | 5 | 5 |
| 8 | 12 | 12 | 12 | 16 | 16 | 17 | 7 | 7 | 7 | 7 |
| 24 | 18 | 18 | 18 | 18 | 18 | 18 | 13 | 13 | 12 | 14 |
| 32 | | | | | | | 14 | 15 | 14 | 15 |
| 40 | | | | | | | 16 | 16 | 16 | 18 |
| 48 | | | | | | | 17 | 17 | 18 | |
| 56 | | | | | | | 18 | 18 | 18 | |

Hrs. = Hours at 177° C. according to ASTM D 4499 (Cycle I)
Exp. = Experiment number

TABLE 11

Results of stabilizing formulation 140581.1 with stabilizer compositions 140622

| Hrs. | Exp. 0 | 1 | 2 | 3 | 4 | 5 |
|---|---|---|---|---|---|---|
| 0 | 5 | 5 | 5 | 5 | 5 | 5 |
| 8 | 12 | 11 | 15 | 11 | 10 | 12 |
| 16 | 17 | 16 | 17 | 14 | 12 | 15 |
| 24 | 18 | 18 | 18 | 15 | 15 | 17 |
| 32 | | | | 17 | 16 | 18 |
| 40 | | | | 18 | 18 | |

TABLE 12

Results of stabilizing formulation 140581.2 with stabilizer compositions 140622

| Hrs. | Exp. 0 | 1 | 2 | 3 | 4 | 5 |
|---|---|---|---|---|---|---|
| 0 | 3 | 3 | 3 | 3 | 3 | 3 |
| 8 | 10 | 9 | 14 | 10 | 6 | 13 |
| 16 | 15 | 14 | 17 | 13 | 13 | 14 |
| 24 | 16 | 16 | 18 | 13 | 16 | 15 |
| 32 | 17 | 17 | 17 | 14 | 18 | 16 |
| 40 | 18 | 18 | 18 | 16 | | 17 |
| 48 | | | | 18 | | 18 |

TABLE 13

Results of stabilizing HMA-formulation 138281 with stabilizer compositions 142823

| Hrs. | Exp. 0 | 1 | 2 | 3 | 4 | 5 | 6 | 7 | 8 | 9 |
|---|---|---|---|---|---|---|---|---|---|---|
| 0 | 5 | 5 | 5 | 5 | 5 | 5 | 5 | 5 | 5 | 5 |
| 8 | 16 | 13 | 14 | 14 | 12 | 12 | 11 | 12 | 12 | 10 |
| 16 | 18 | 16 | 18 | 18 | 16 | 16 | 15 | 16 | 16 | 12 |
| Probe Tack [gr] (after 16 hrs) | 115 | 0 | 0 | 0 | 61 | 120 | 276 | 412 | 311 | 186 |
| Viscosity [mPas] (after 16 hrs) | 655 | 593 | 688 | 668 | 673 | 783 | 705 | 795 | 715 | 766 |

TABLE 14

Results of stabilizing HM-PSA formulation 140525 with stabilizer compositions 140747

| Hrs. | Exp. 0 | 1 | 2 | 3 | 4 | 5 | 6 | 7 |
|---|---|---|---|---|---|---|---|---|
| 0 | 3 | 3 | 3 | 3 | 3 | 3 | 3 | 3 |
| 4 | 18 | 14 | 15 | 16 | 16 | 17 | 13 | 13 |
| 8 | | 18 | 18 | 18 | 18 | 18 | 17 | 16 |
| 12 | | | | | | | | 18 |
| Surface | Skin | | | | Skin | Skin | | |

TABLE 15

Results of stabilizing HM-PSA formulation 141150 with stabilizer compositions 141305

| Hrs. | Exp. 0 | 1 | 2 | 3 | 4 | 5 | 6 | 7 |
|---|---|---|---|---|---|---|---|---|
| 0 | 10 | 8 | 8 | 8 | 8 | 8 | 8 | 8 |
| 8 | 16 | 11 | 13 | 18 | 15 | 14 | 14 | 16 |
| 24 | 18 | 18 | 17 | | 17 | 16 | 16 | 17 |
| 30 | | | 18 | | 18 | 17 | 17 | 17 |

TABLE 16

Results of stabilizing HM-PSA formulation 142492 with stabilizer composition 142523

| Hrs. | Exp. 0 | 1 | 2 | 3 | 4 | 5 | 6 |
|---|---|---|---|---|---|---|---|
| 0 | 8 | 8 | 8 | 8 | 8 | 8 | 8 |
| 2 | 10 | 10 | 10 | 10 | 10 | 10 | 10 |
| 8 | 13 | 13 | 13 | 13 | 13 | 13 | 13 |
| 18 | 18 | 18 | 18 | 18 | 18 | 18 | 18 |
| Tack [gr] (after 18 hrs) | 0 | 0 | 0 | 0 | 116 | 275 | 178 |

TABLE 17

Results of stabilizing commercial EVA-HMA 2075.1 with stabilizer composition 147802

| Hrs | 0 | 5 | 6 |
|---|---|---|---|
| 0 | 1 | 1 | 1 |
| 8 | 6 | 4 | 5 |
| 16 | 13 | 10 | 8 |

The invention claimed is:

1. A stabilized hot melt adhesive, comprising a) one or more hot melt adhesive materials selected from the group consisting of a polyolefin, a styrene-isoprene-styrene block co-polymer, a styrene-butadiene-styrene block co-polymer, an polyacrylate, a styrene-ethylene-butadiene-styrene acryl-copolymer, an ethylene vinyl acetate, a polyamide, a polyester, a polyurethane, a polyimide, a silane terminated polyolefin, a silane terminated polyether, and a silane terminated polyurethane; and b) a stabilizer composition comprising two or three of components (A), (B) and (C), wherein the stabilizer composition comprises components (A) and (C) or the stabilizer composition comprises components (A), (B), and (C), wherein (A) is a sterically hindered amine selected from the group consisting of:

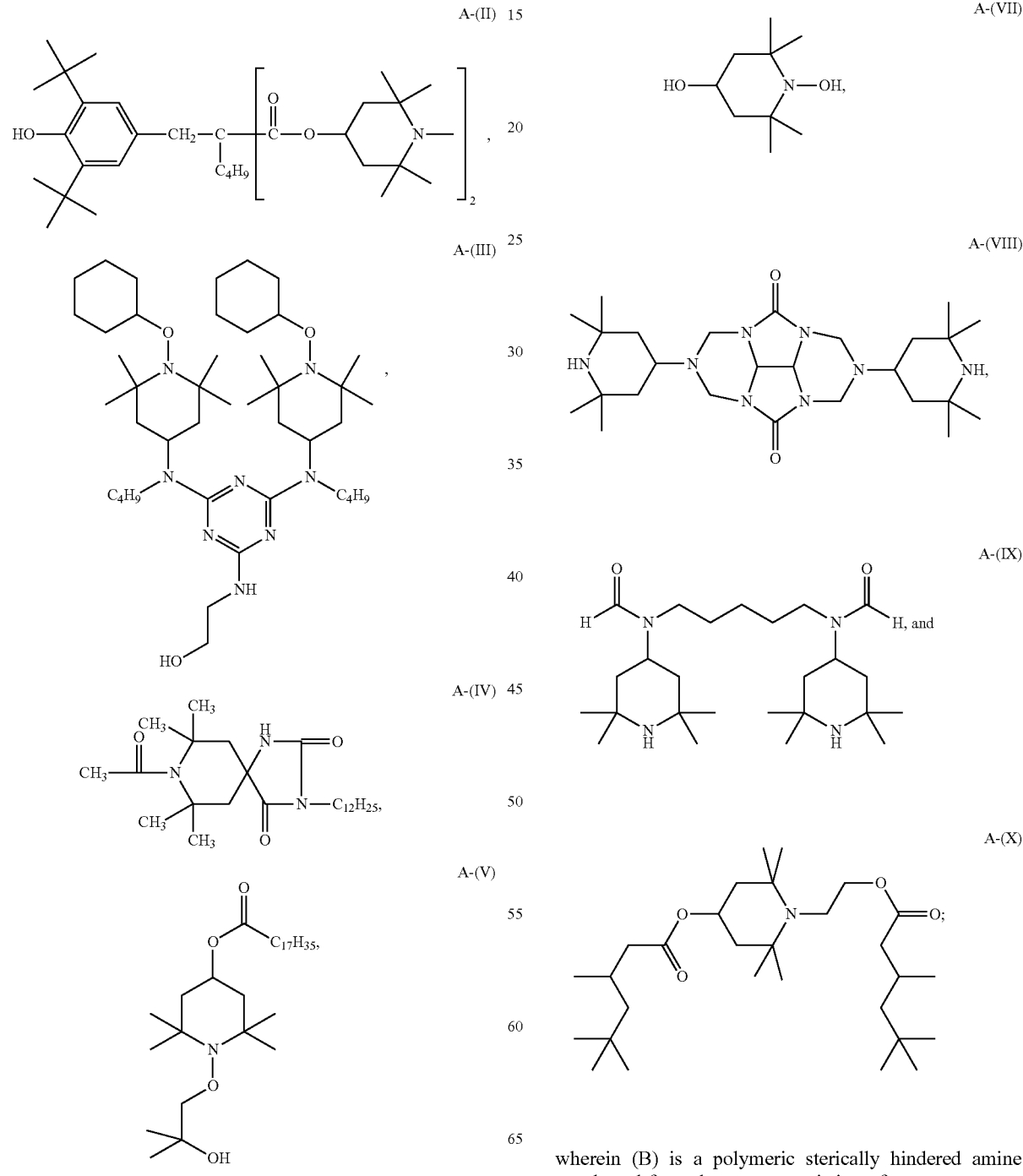
wherein (B) is a polymeric sterically hindered amine selected from the group consisting of:

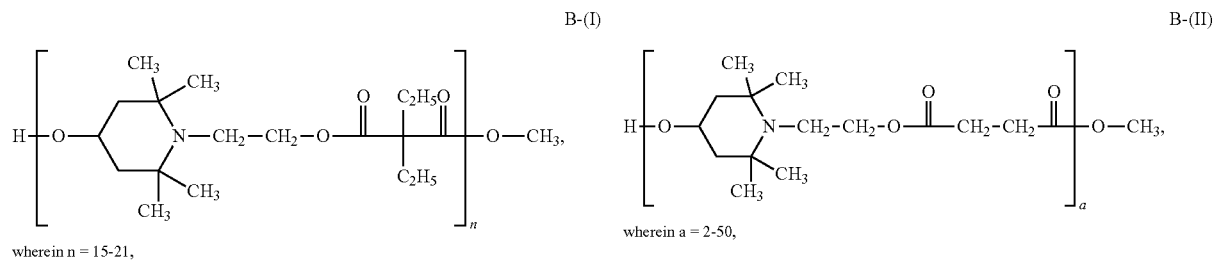
wherein n = 15-21,
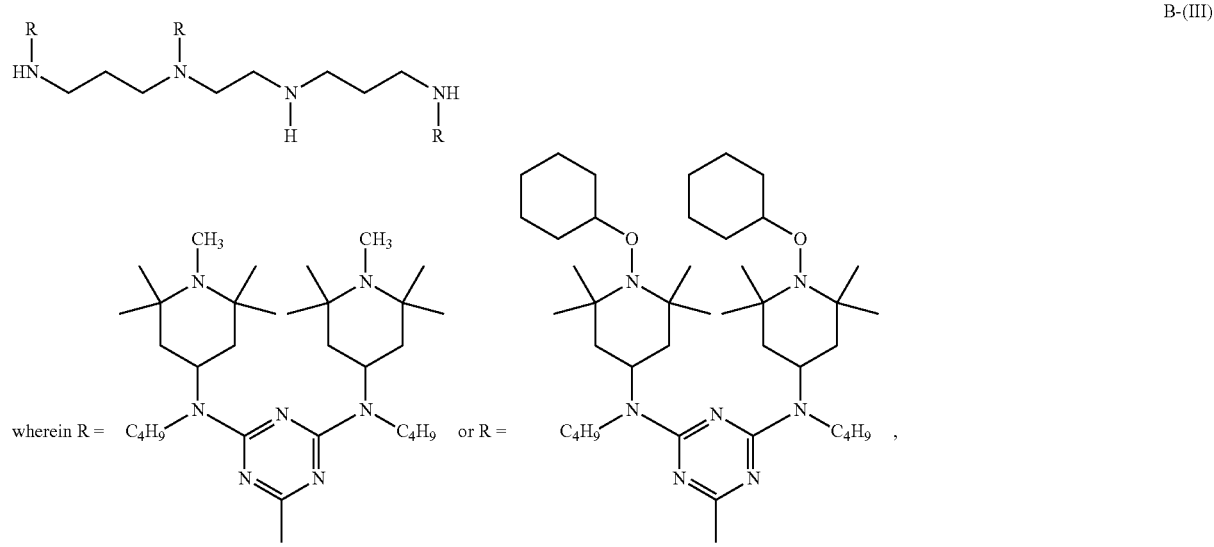
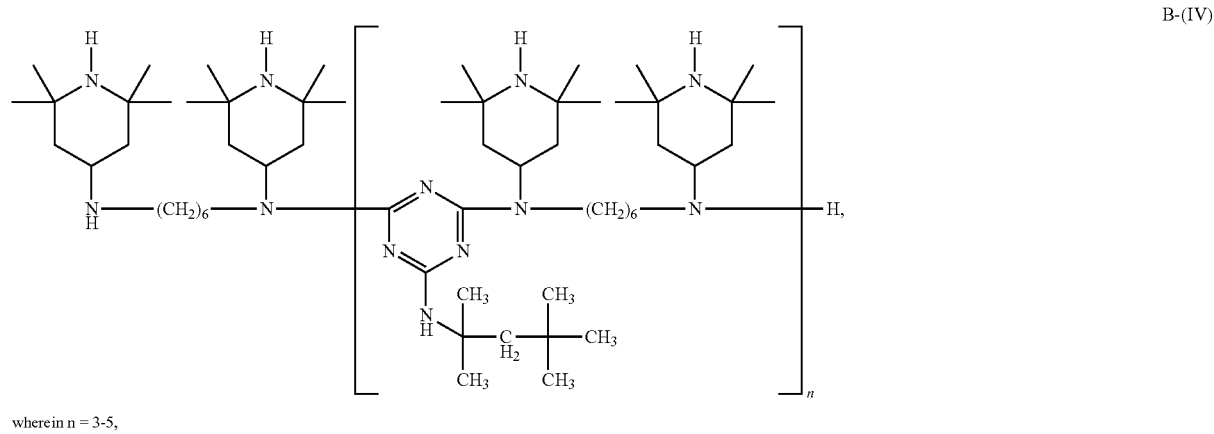
wherein n = 3-5,
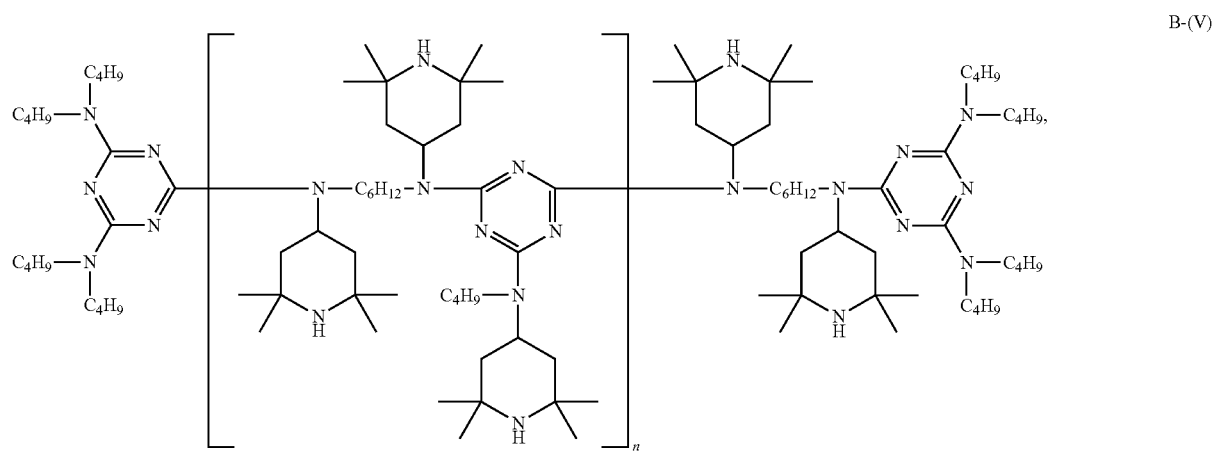

wherein n = is 3-5,
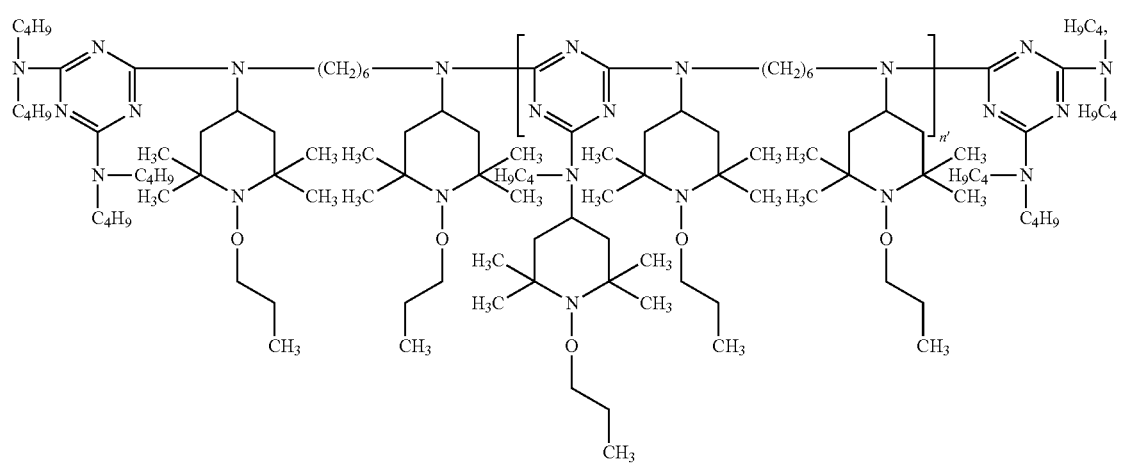
B-(VI)
wherein n = 3-5, and
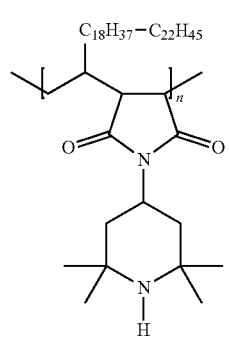
B-(VII)
wherein n = 5-8;
and
wherein (C) is a sterically hindered phenol selected from the group consisting of:
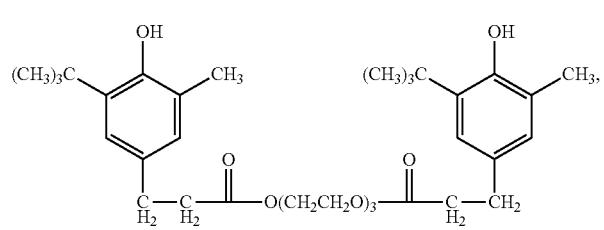
C-(I)
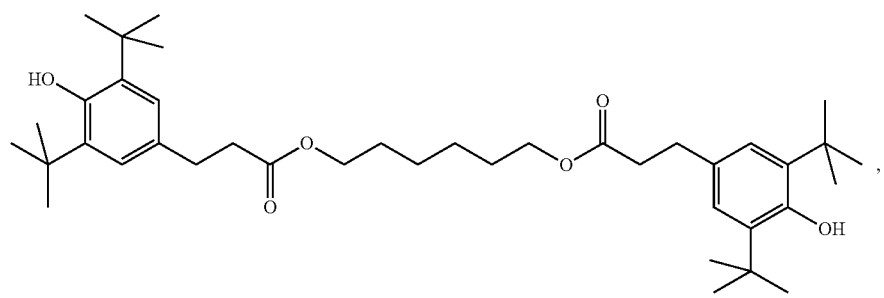
C-(II)

-continued
C-(III)
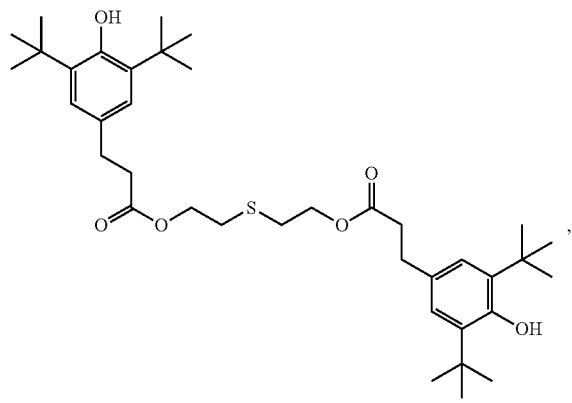
C-(IV)
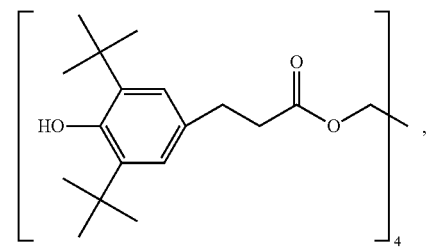
C-(V)
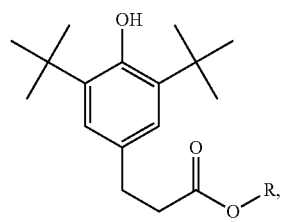
wherein R = C₈H₁₇ or C₁₈H₃₇
C-(VI)
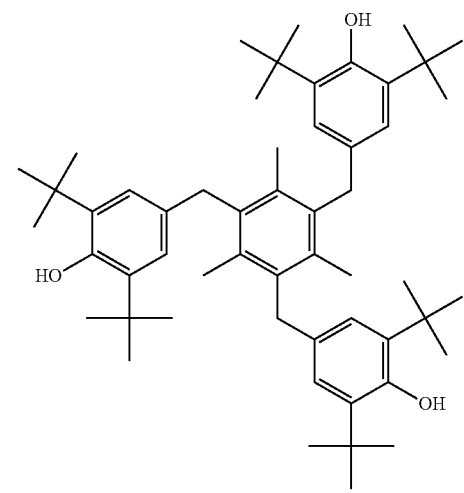
C-(VII)
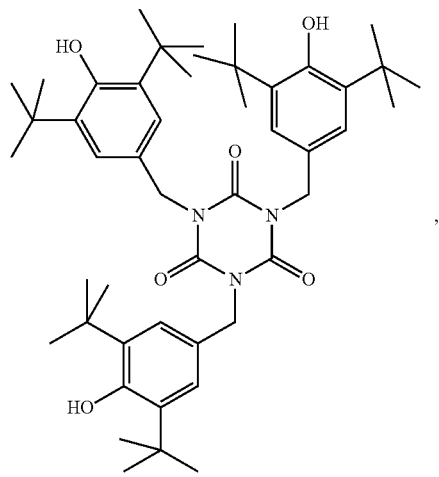
C-(VIII)
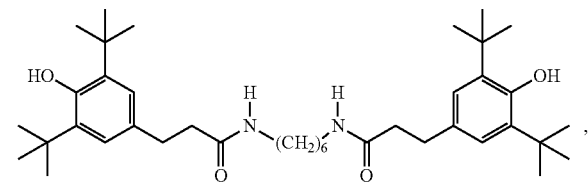
C-(IX)
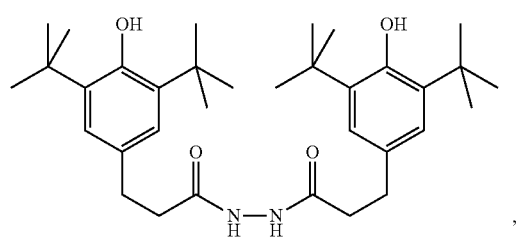

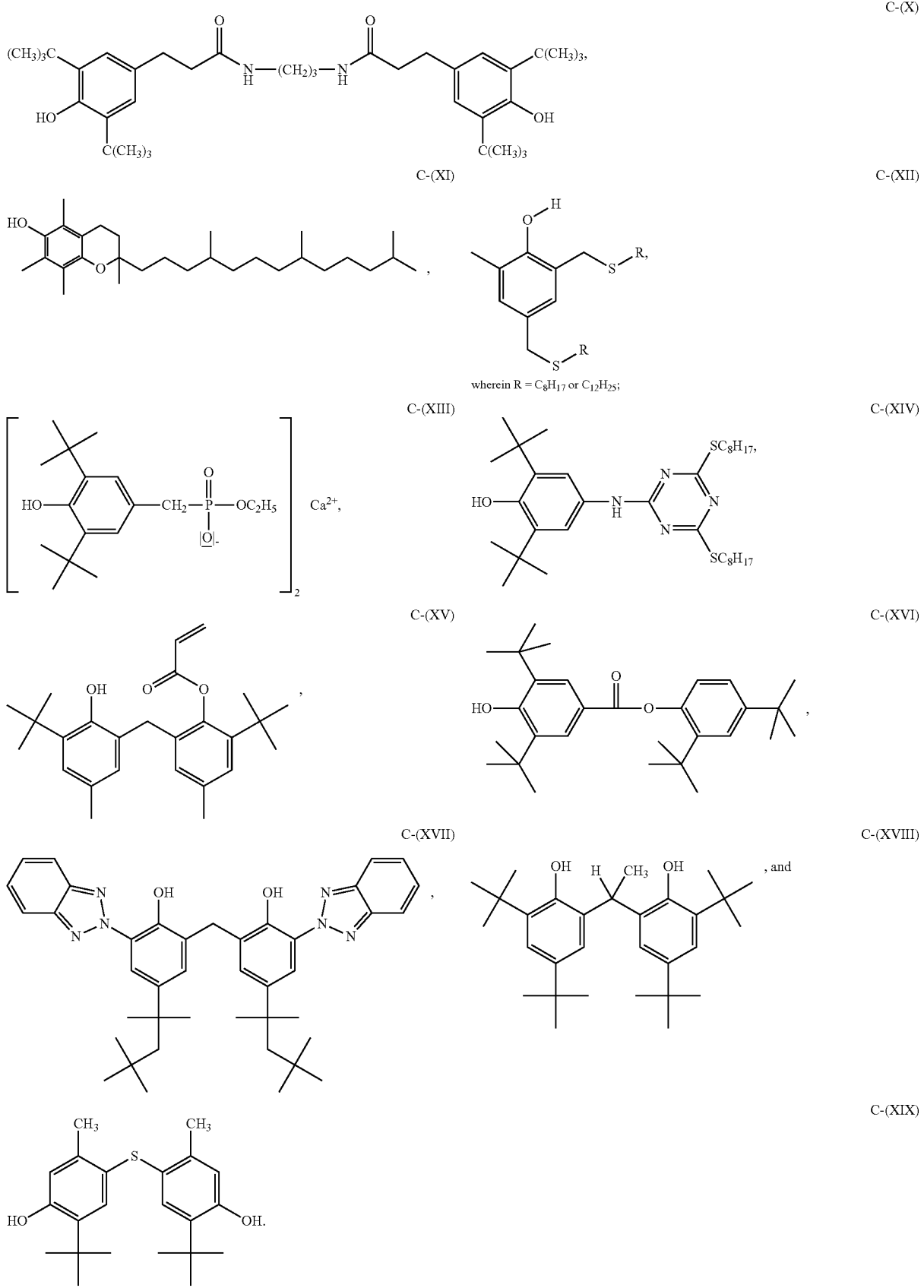

2. The stabilized hot melt adhesive according to claim 1, wherein the stabilizer composition comprises components (A) and (C), and wherein a weight ratio between components (A) and (C) is between 1:5 and 5:1.

3. The stabilized hot melt adhesive according to claim 1, wherein the stabilizer composition comprises components (A), (B), and (C), and wherein a weight ratio between components (A), (B) and (C) is between 8:1:1 and 1:8:1 and 1:1:8.

4. The stabilized hot melt adhesive according to claim 1, wherein component (A) is selected from the group consisting of:

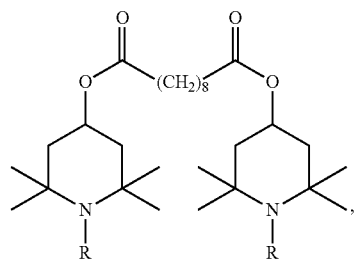

A-(I)

wherein R = H, CH₃ or OC₈H₁₇

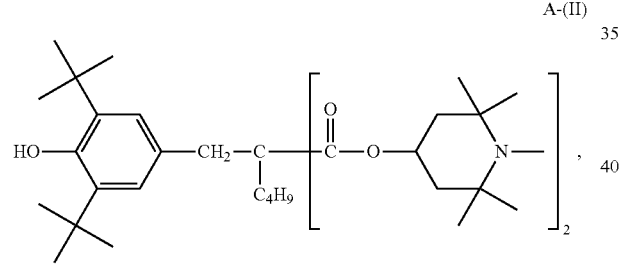

A-(II)

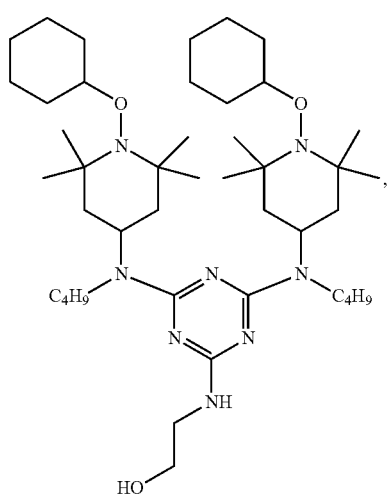

A-(III)

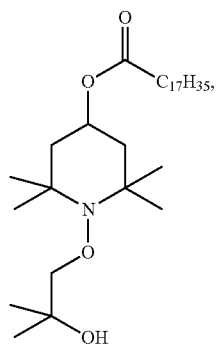

A-(V)

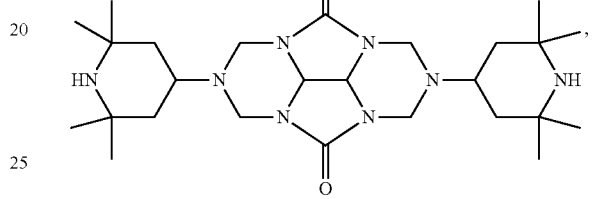

A-(VIII)

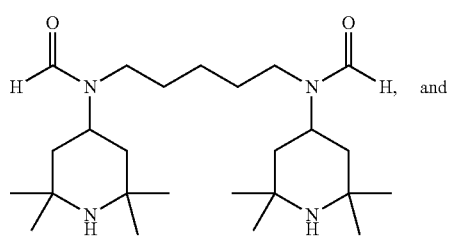

A-(IX)

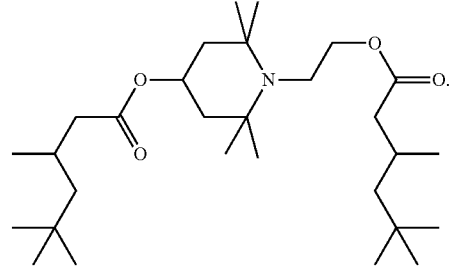

A-(X)

5. The stabilized hot melt adhesive according to claim 1, wherein component (A) is selected from the group consisting of:

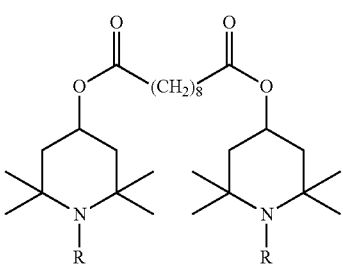

A-(I)

wherein R = H, and

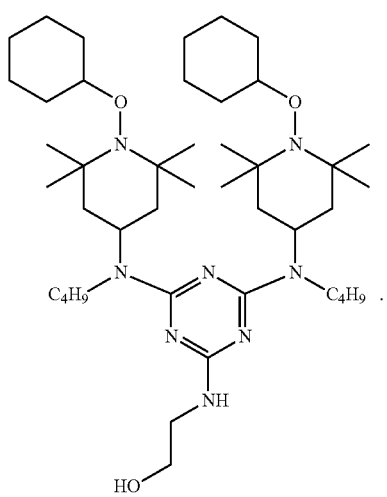
6. The stabilized hot melt adhesive according to claim 1, wherein the stabilizer composition comprises components (A), (B), and (C) and
wherein component (B) is selected from the group consisting of:
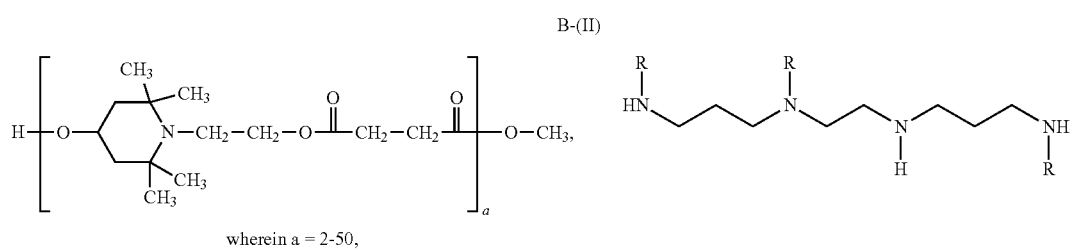
wherein a = 2-50,
wherein R =
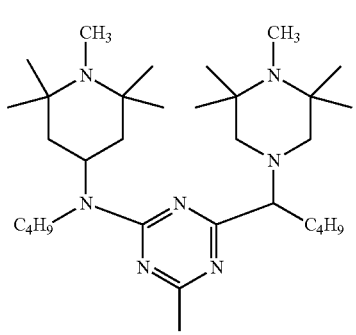

-continued
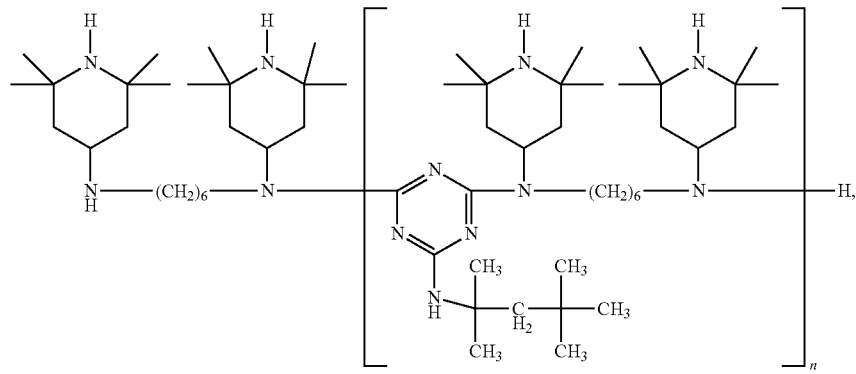
B-(IV)
wherein n = 3-5,
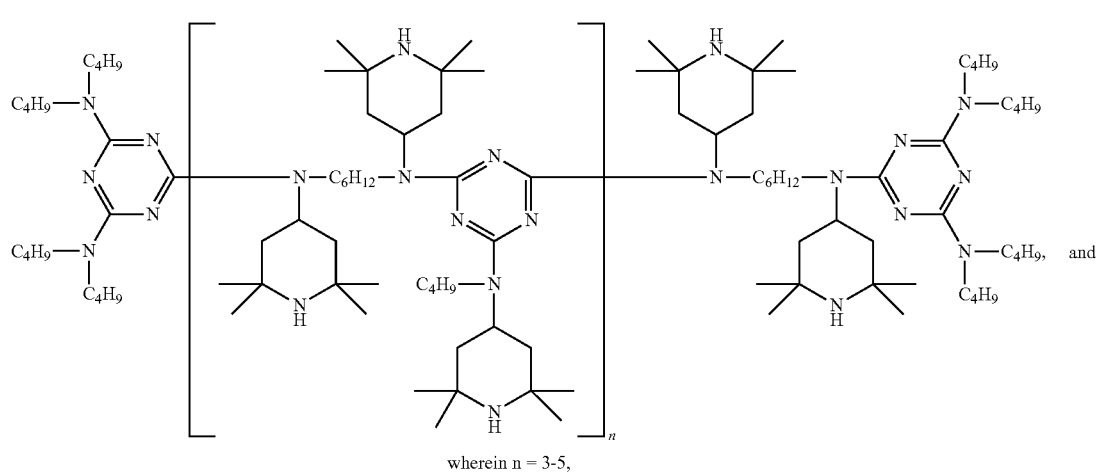
B-(V)
wherein n = 3-5,
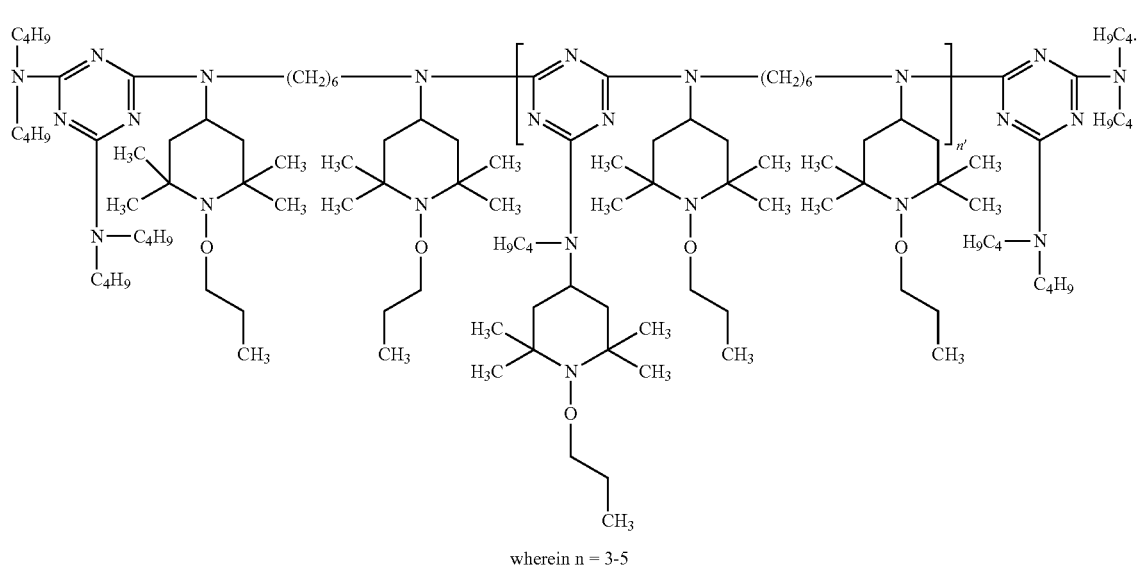
B-(VI)
wherein n = 3-5
7. The stabilized hot melt adhesive according to claim 1, wherein the stabilizer composition comprises components (A), (B), and (C), and
   wherein component (B) is selected from the group consisting of:

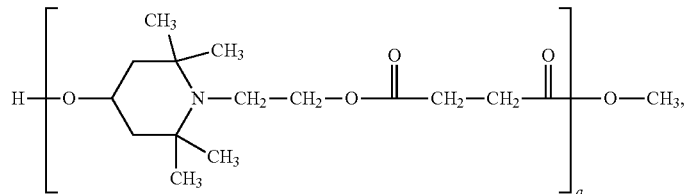
B-(II)
wherein a = 2-50,
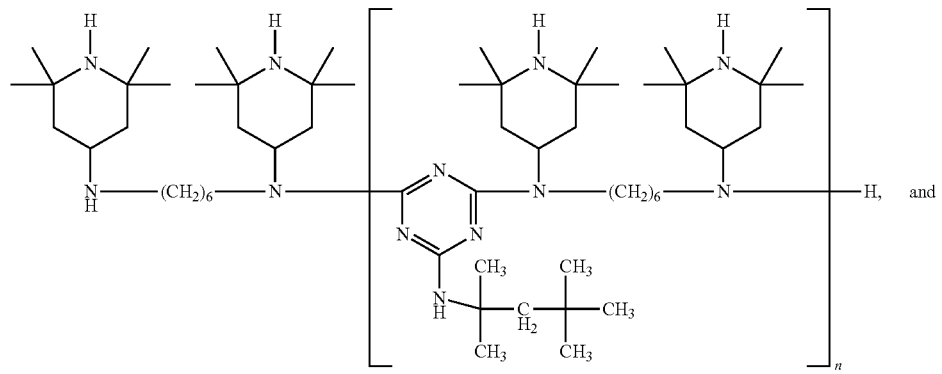
B-(IV)
wherein n = 3-5.
8. The stabilized hot melt adhesive according to claim 1, wherein component (C) is selected from the group consisting of:
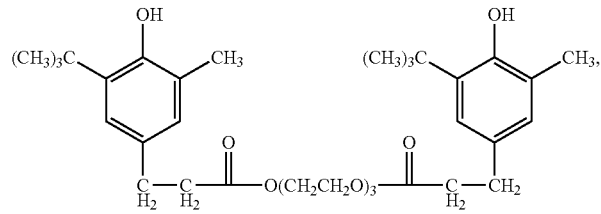
C-(I)
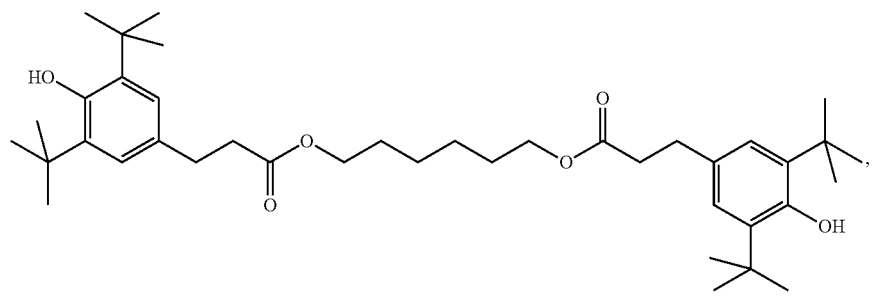
C-(II)

-continued
C-(III)
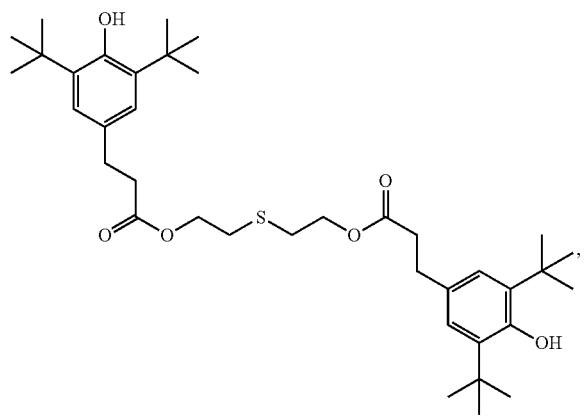
C-(IV)
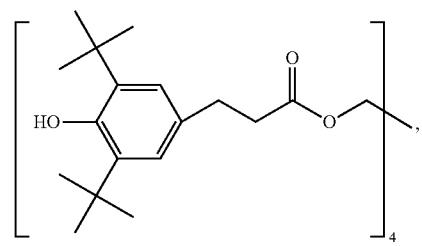
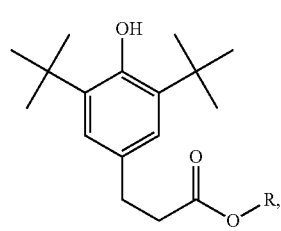
wherein R = C$_8$H$_{17}$ or C$_{18}$H$_{37}$
C-(V)
C-(VI)
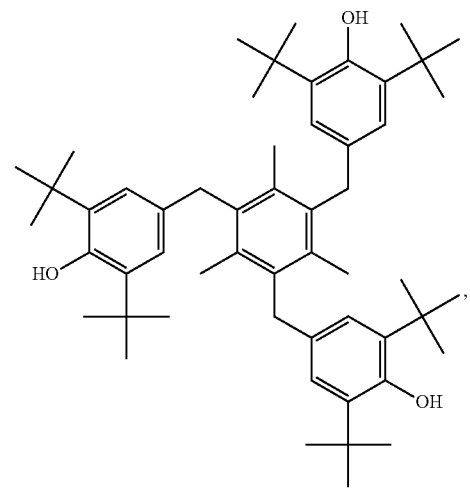
C-(VII)
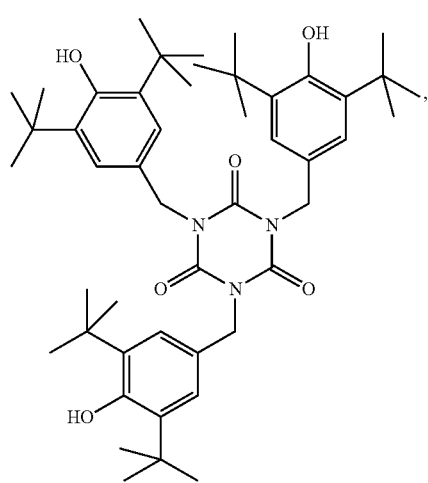
C-(VIII)
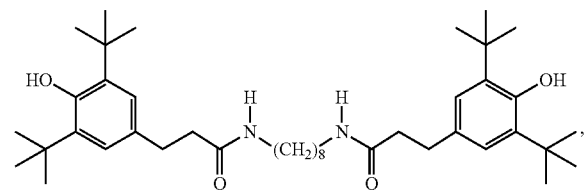

-continued
C-(IX)
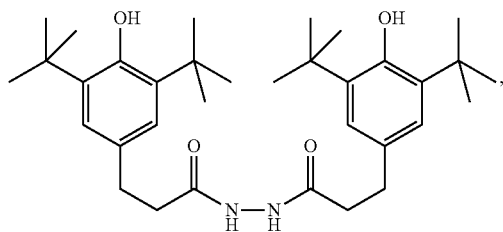
C-(X)
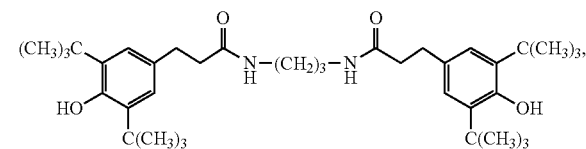
C-(XI)
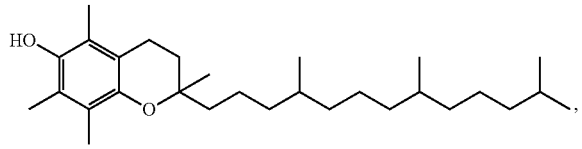
C-(XII)
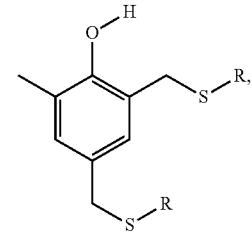
wherein R = $C_8H_{17}$ or $C_{12}H_{25}$
C-(XIII)
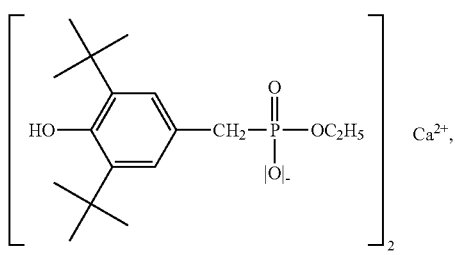
C-(IX)
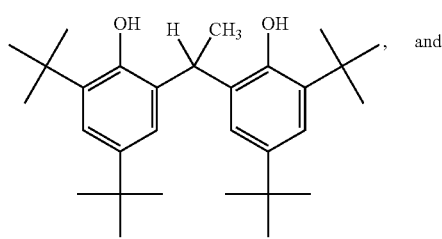
C-(XVII) and
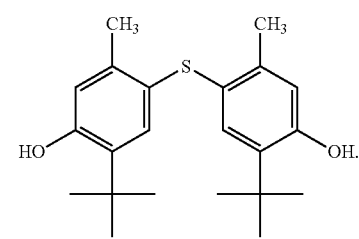
C-(XIX)
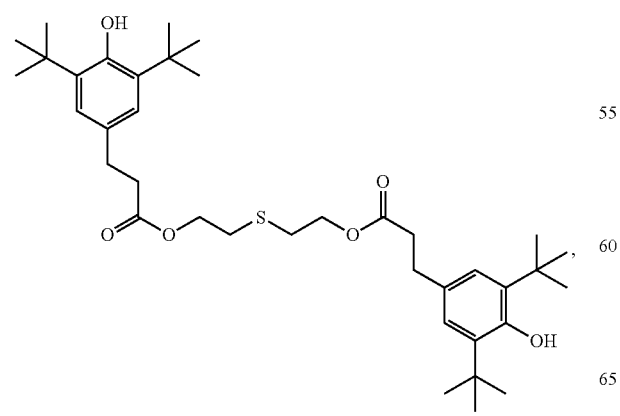
9. The stabilized hot melt adhesive according to claim 1, wherein component (C) is selected from the group consisting of:
C-(III)
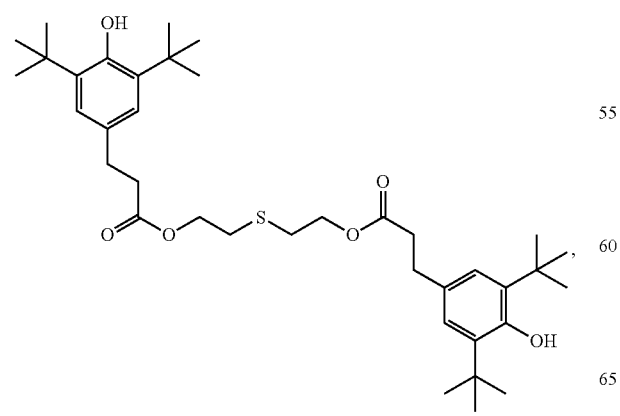
-continued
C-(IV)
C-(V)
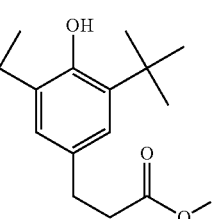
wherein R = $C_{18}H_{37}$

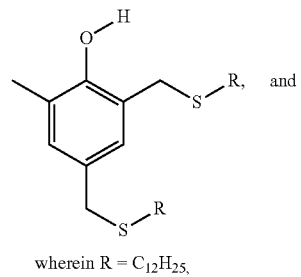
C-(XII)

wherein R = $C_{12}H_{25}$,

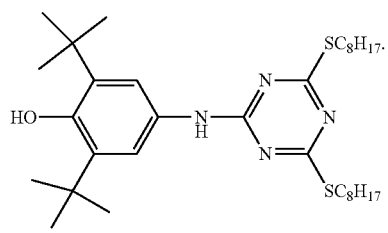
C-(XIV)

10. The stabilized hot melt adhesive according to claim 1, wherein the stabilizer composition further comprises one or more additives selected from the group consisting of: a phosphite, a thioether, a secondary arylamine, a hydroxylamine based stabilizer, a UV-absorber and an inorganic stabilizer.

11. A method of stabilizing a hot melt adhesive against degradation by one or more of light, oxygen and heat, the method comprising:

adding a stabilizer composition to one or more hot melt adhesive materials selected from the group consisting of a polyolefin, a styrene-isoprene-styrene block co-polymer, a styrene-butadiene-styrene block co-polymer, a polyacrylate, a styrene-ethylene-butadiene-styrene acryl-copolymer, an ethylene vinyl acetate, a polyamide, a polyester, a polyurethane, a polyimide, a silane terminated polyolefin, a silane terminated polyether, and a silane terminated polyurethane, wherein the stabilizer composition comprises two or three of components (A), (B) and (C), wherein the stabilizer composition comprises components (A) and (C) or the stabilizer composition comprises components (A), (B), and (C), wherein (A) is a sterically hindered amine selected from the group consisting of:

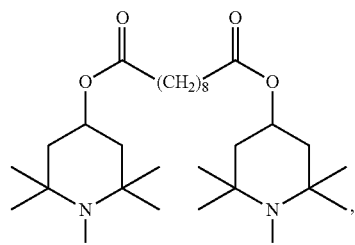
A-(I)

wherein R = H, $CH_3$, $OC_8H_{17}$

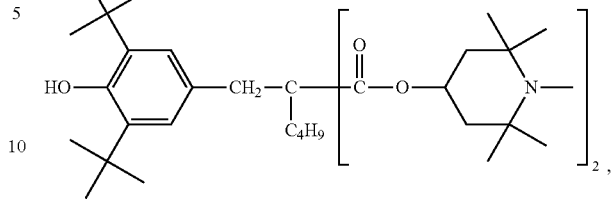
A-(II)

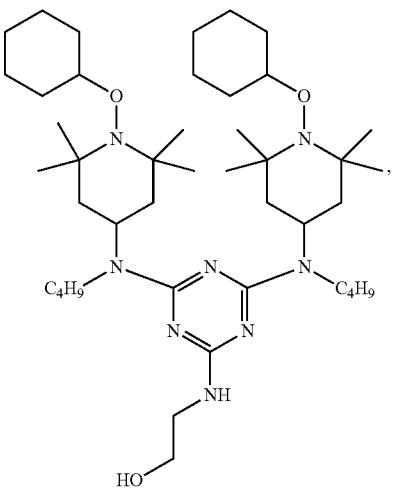
A-(III)

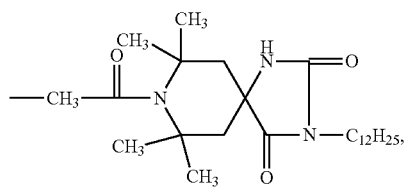
A-(IV)

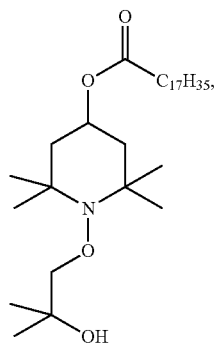
A-(V)

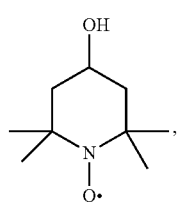
A-(VI)

A-(VII)
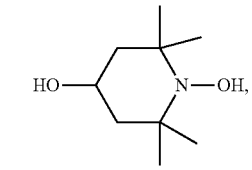
A-(VIII)
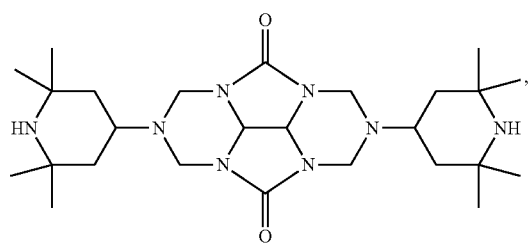
A-(IX)
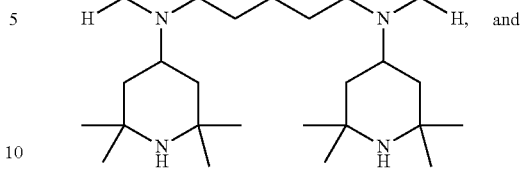
A-(X)
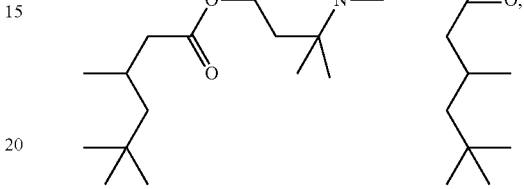
wherein (B) is a polymeric sterically hindered amine selected from the group consisting of:
B-(I)
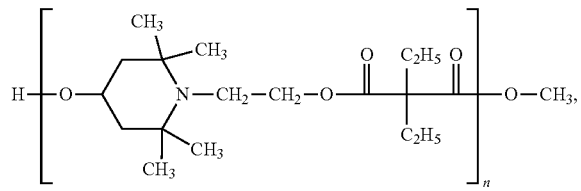
wherein n = 15-21
B-(II)
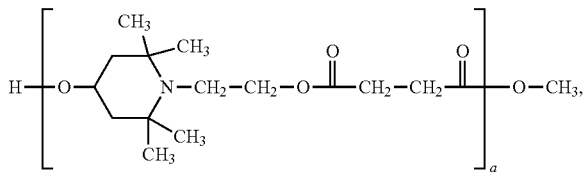
wherein a = 2-50
B-(III)
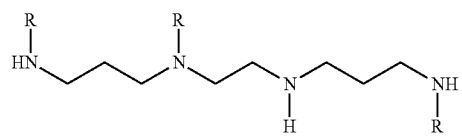
wherein R =
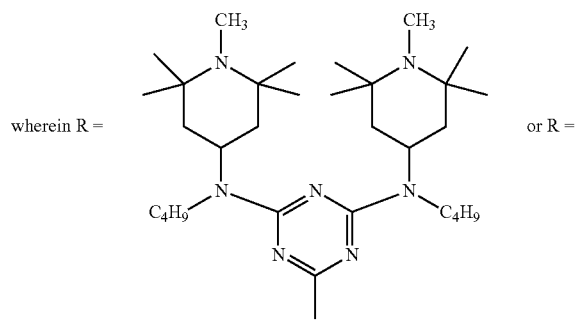
or R =
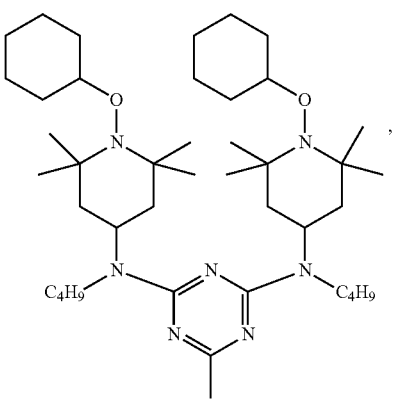

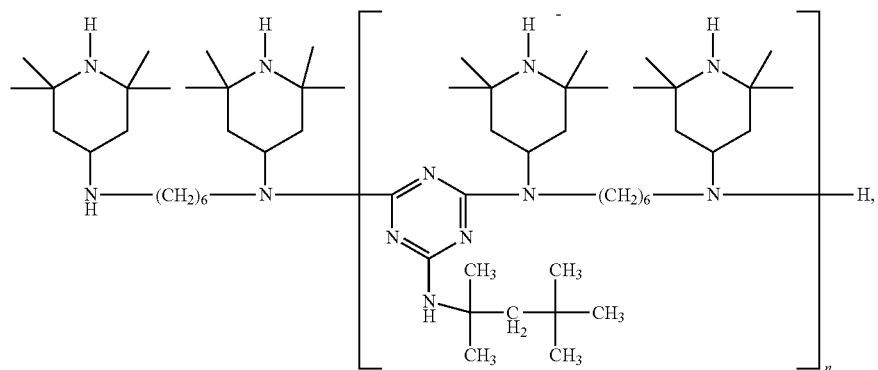
B-(IV)
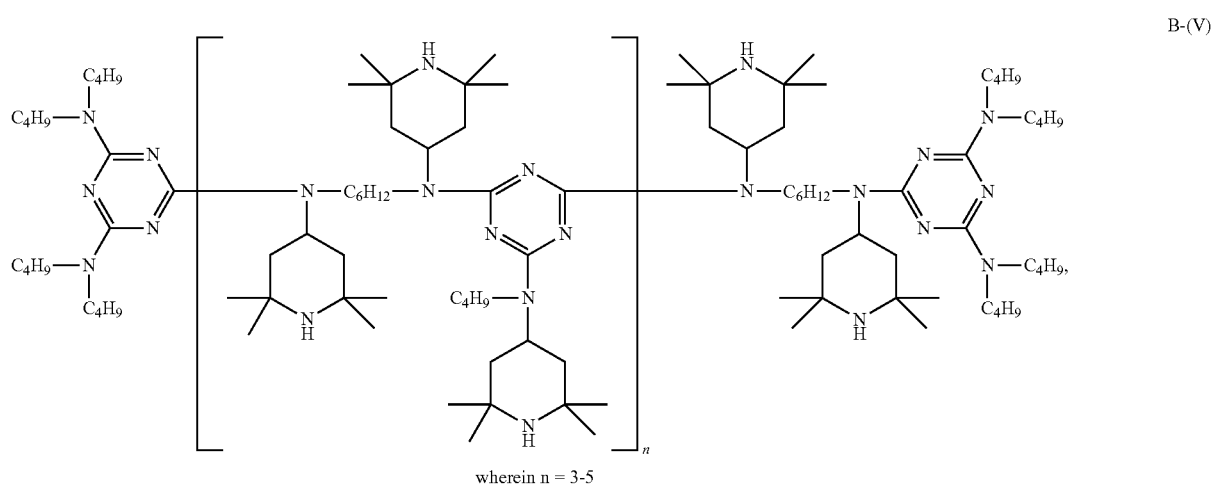
B-(V)
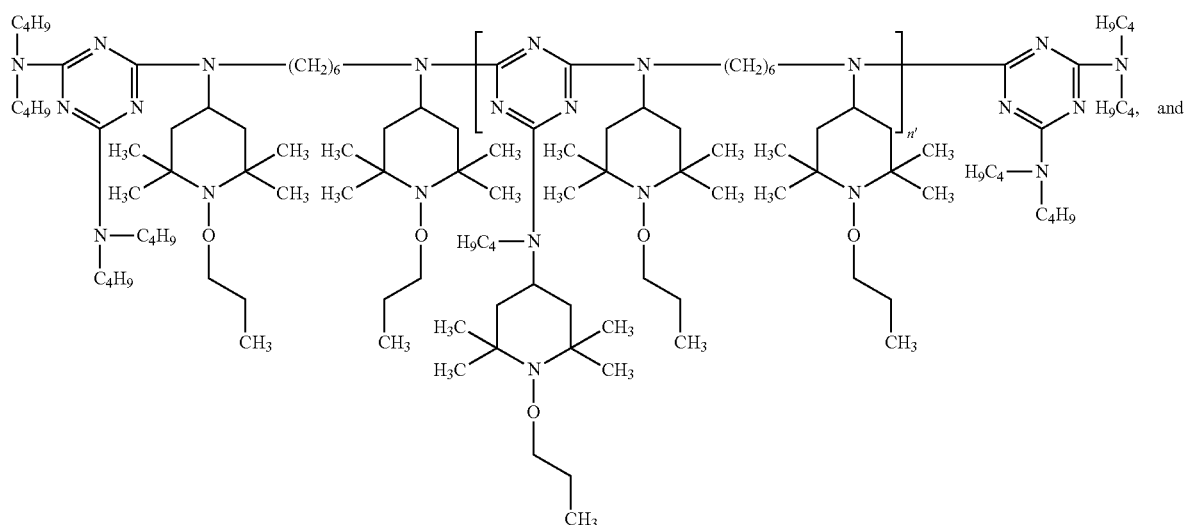
B-(VI)

-continued
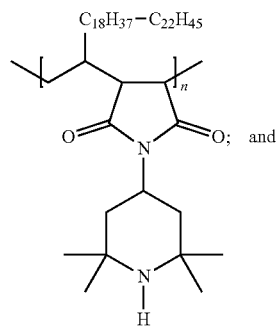
wherein n = 5-8
wherein (C) is a sterically hindered phenol selected from the group consisting of:
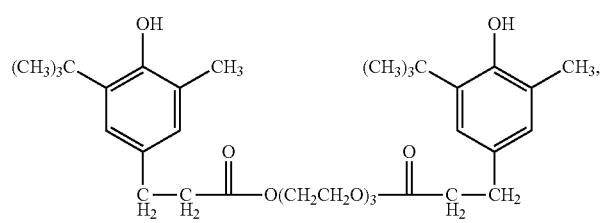
C-(I)
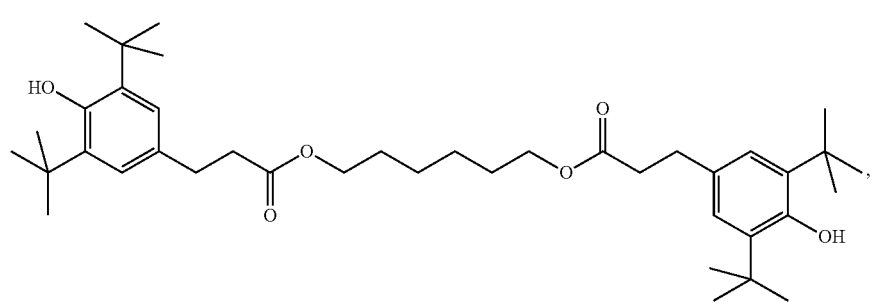
C-(II)
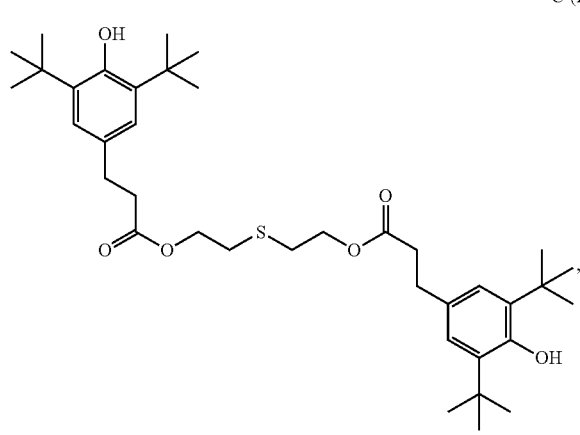
C-(III)
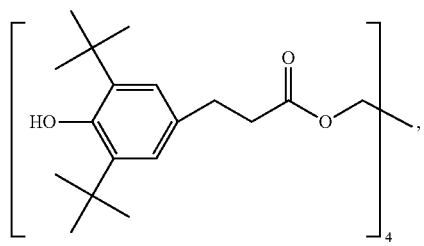
C-(IV)

-continued
C-(V)
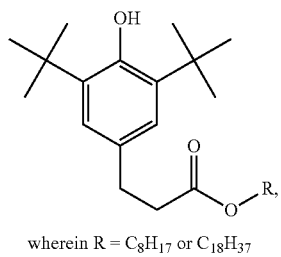
wherein R = C$_8$H$_{17}$ or C$_{18}$H$_{37}$
C-(VI)
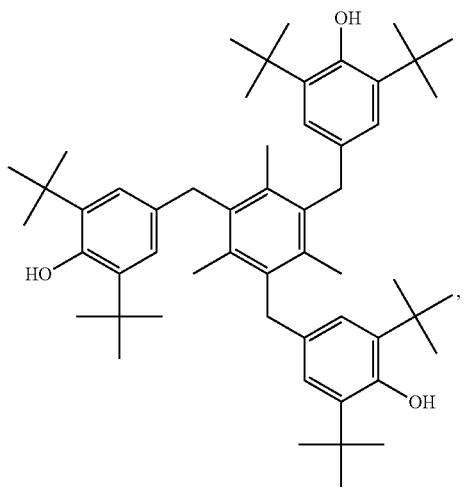
C-(VII)
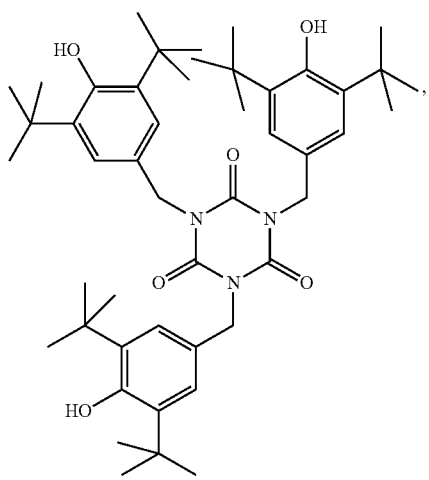
C-(VIII)
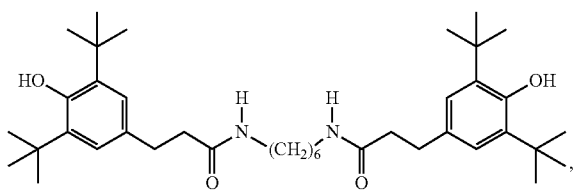
C-(IX)
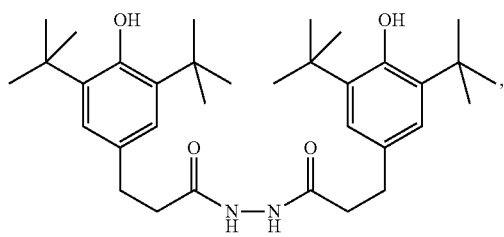
C-(X)
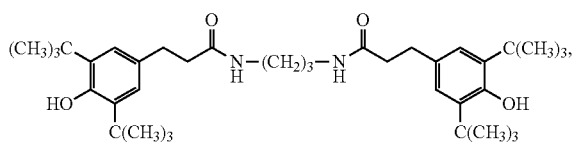
C-(XI)
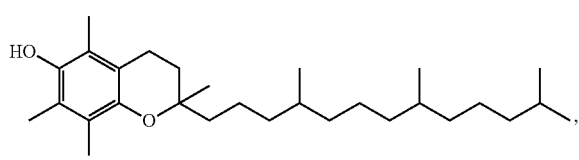
C-(XII)
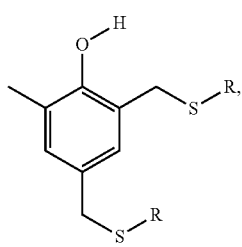
wherein R = C$_8$H$_{17}$ or C$_{12}$H$_{25}$ C-(XIII)
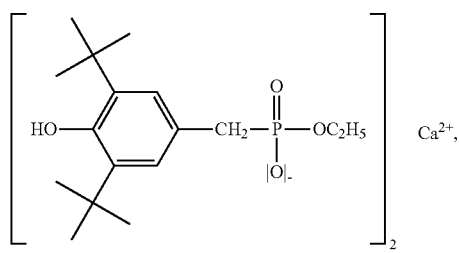
C-(XIV)
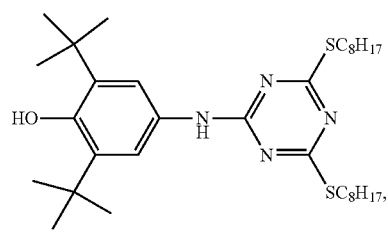
C-(XV)
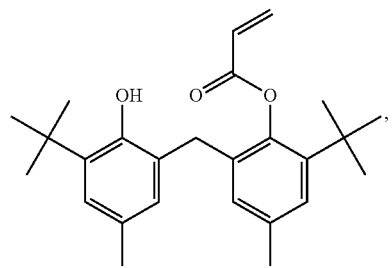
C-(XVI)
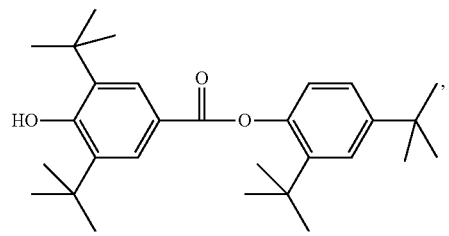
C-(XVII)
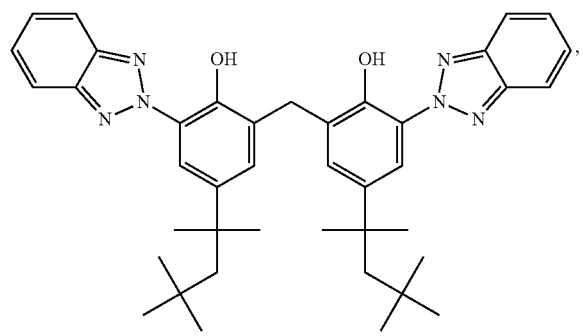
C-(XVIII)
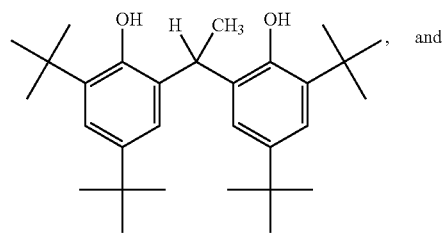, and
C-(XIX)
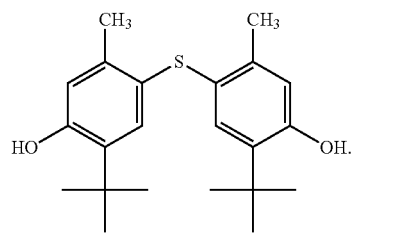
* * * * *

UNITED STATES PATENT AND TRADEMARK OFFICE
CERTIFICATE OF CORRECTION

PATENT NO. : 10,563,098 B2
APPLICATION NO. : 15/575395
DATED : February 18, 2020
INVENTOR(S) : Bernd Hoevel et al.

It is certified that error appears in the above-identified patent and that said Letters Patent is hereby corrected as shown below:

On the Title Page

Item [72], Line 4, "Patteln" should read -- Pratteln --.

In the Specification

Column 1, Line 62, "(HM-PSA)" should read -- (HM-PSA). --.

Column 2, Line 58, "(usually paraffins" should read -- (usually paraffins) --.

Column 3, Line 31, "(e.g., rosins" should read -- e.g., resins --.

Column 3, Line 31, "derivates," should read -- derivatives, --.

Column 15, Line 45, "ditert." should read -- di-tert. --.

Column 15, Lines 60-61, "benzotriazols," should read -- benzotriazoles, --.

Columns 17-18, Table 2, Line 35, "Eastotec" should read -- Eastotac --.

Columns 17-18, Table 2, Line 42, "Acetat" should read -- Acetate --.

Columns 19-20, Table 5, Line 38, "Chimasorb" should read -- Chimassorb --.

Columns 19-20, Table 6, Line 50, "Chimasorb" should read -- Chimassorb --.

Columns 19-20, Table 6, Line 51, "C-(iV)" should read -- C-(IV) --.

Signed and Sealed this
Twenty-second Day of December, 2020

Andrei Iancu
*Director of the United States Patent and Trademark Office*

CERTIFICATE OF CORRECTION (continued)
U.S. Pat. No. 10,563,098 B2

In the Claims

Column 24, Line 51, Claim 1, "of a polyolefin" should read -- of polyolefin --.